United States Patent
Uenodan et al.

(10) Patent No.: US 10,718,647 B2
(45) Date of Patent: Jul. 21, 2020

(54) THERMAL FLOWMETER INCLUDING AN INCLINED PASSAGE

(71) Applicant: HITACHI AUTOMOTIVE SYSTEMS, LTD., Hitachinaka-shi, Ibaraki (JP)

(72) Inventors: Akira Uenodan, Ibaraki (JP); Tomoaki Saito, Ibaraki (JP); Naoki Saito, Ibaraki (JP); Masashi Fukaya, Tokyo (JP); Shinobu Tashiro, Ibaraki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 110 days.

(21) Appl. No.: 16/092,025

(22) PCT Filed: Apr. 20, 2017

(86) PCT No.: PCT/JP2017/015839
§ 371 (c)(1),
(2) Date: Oct. 8, 2018

(87) PCT Pub. No.: WO2017/212801
PCT Pub. Date: Dec. 14, 2017

(65) Prior Publication Data
US 2019/0162570 A1  May 30, 2019

(30) Foreign Application Priority Data
Jun. 7, 2016 (JP) ................. 2016-113751

(51) Int. Cl.
*G01F 1/00* (2006.01)
*G01F 1/684* (2006.01)
*F02M 35/10* (2006.01)

(52) U.S. Cl.
CPC ..... *G01F 1/6842* (2013.01); *F02M 35/10386* (2013.01); *G01F 1/00* (2013.01); *G01F 1/684* (2013.01)

(58) Field of Classification Search
CPC ........ G01F 1/692; G01F 1/6842; G01F 1/684; G01F 1/6845; H01L 28/20; H01L 21/565;
(Continued)

(56) References Cited

U.S. PATENT DOCUMENTS 6,557,408 B1 * 5/2003 Mueller .................... G01F 5/00
73/202.5
7,891,240 B2 * 2/2011 Morino ................. G01F 1/6842
73/202.5
(Continued)

FOREIGN PATENT DOCUMENTS

JP         9-329473 A    12/1997
JP      2012-93203 A     5/2012
(Continued)

OTHER PUBLICATIONS

International Search Report and Written Opinion issued in corresponding application No. PCT/JP2017/015839 dated Jul. 4, 2017.
(Continued)

*Primary Examiner* — Brandi N Hopkins
(74) *Attorney, Agent, or Firm* — Foley & Lardner LLP

(57) ABSTRACT

A thermal flowmeter includes: a sub-passage (307) that takes a part of a gas (30) to be measured flowing through a main passage; and a flow measurement unit (451) disposed inside the sub-passage (307). The sub-passage (307) includes: a first passage (351) provided on a measurement surface (451a) side of the flow measurement unit (451); a second passage (352) provided on a back surface (451b) side of the flow measurement unit (451); and an inclined passage (361) provided on an upstream side of an inlet (351a) of the first passage in a forward flow direction F of the gas (30) to be measured in the first passage (351).

9 Claims, 23 Drawing Sheets

(58) Field of Classification Search
CPC ... H01L 2924/1815; H01L 2224/49171; H01L 2224/05553; H01L 2224/48247; H01L 2924/00012; H01L 2924/00014; H01L 2924/10158; H01L 2924/181; H01L 2224/48091; G01P 5/12
See application file for complete search history.

(56) References Cited

U.S. PATENT DOCUMENTS

| | | | |
|---|---|---|---|
| 10,444,047 B2* | 10/2019 | Briese | G01F 15/00 |
| 10,520,343 B2* | 12/2019 | Morino | G01F 1/684 |
| 2012/0048005 A1* | 3/2012 | Renninger | G01F 1/6842 |
| | | | 73/114.32 |
| 2014/0174166 A1 | 6/2014 | Mais et al. | |
| 2015/0160054 A1 | 6/2015 | Tashiro et al. | |

FOREIGN PATENT DOCUMENTS

| | | |
|---|---|---|
| WO | WO-2013/187228 A1 | 12/2013 |
| WO | WO-2015/045435 A1 | 4/2015 |

OTHER PUBLICATIONS

Office Action issued in corresponding Japanese patent application No. 2018-522364, dated Jun. 4, 2019, with English translation.

\* cited by examiner

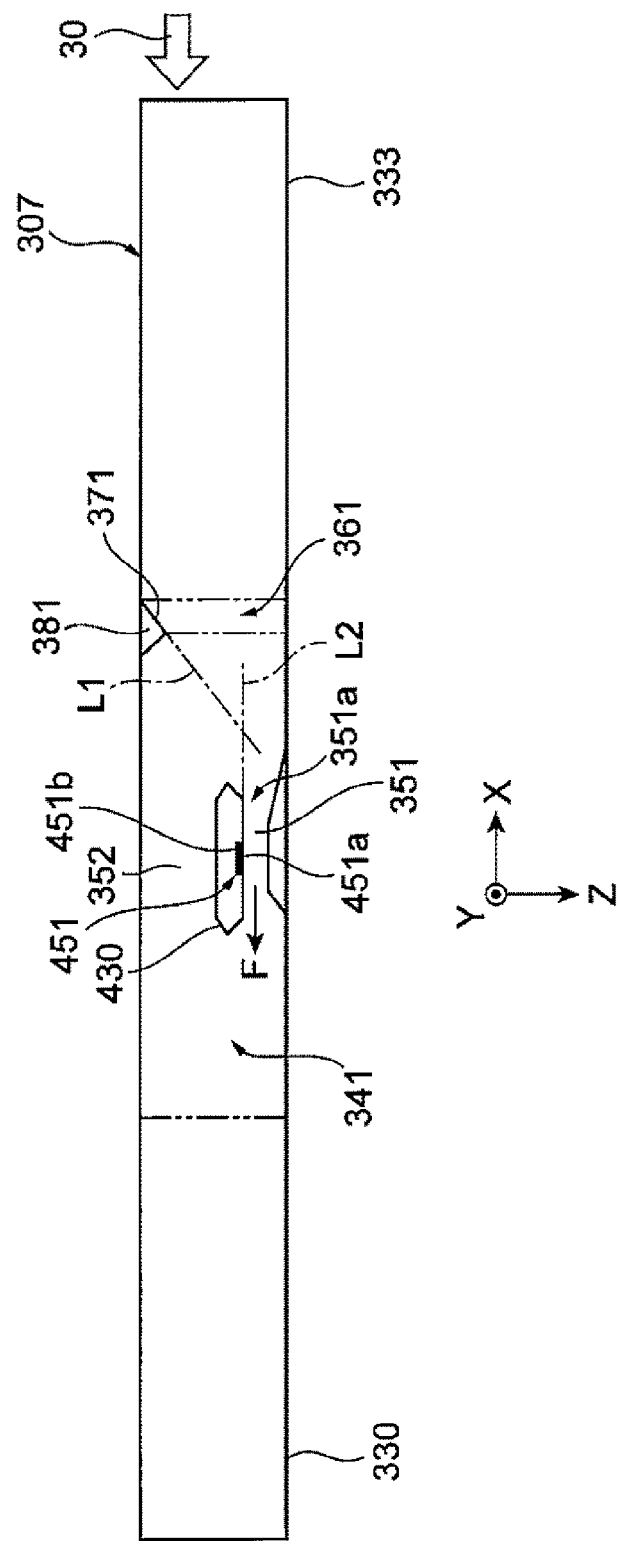

THERMAL FLOWMETER INCLUDING AN INCLINED PASSAGE

TECHNICAL FIELD

The present invention relates to a thermal flowmeter.

BACKGROUND ART

As a conventional thermal flowmeter, a flow measurement device, which includes a sub-passage disposed in a main passage through which a fluid flows and taking a part of the fluid; a flow measurement element disposed inside the sub-passage and having a heating resistor pattern formed therein; and a support on which the flow measurement element is mounted, is known (see claim 1 and the like of the PTL 1 to be described below).

The conventional flow measurement device includes a first fluid passage portion and a second fluid passage portion. The first fluid passage portion is constituted by a surface on which a flow measurement element is mounted, and a passage forming surface of the sub-passage. The second fluid passage portion is constituted by a surface on the opposite side of the surface on which a flow measurement element is mounted, and the passage forming surface of the sub-passage.

In the conventional flow measurement device, the passage forming surface of the first fluid passage portion opposing the flow measurement element on the upstream side of the flow of the fluid has an inclined surface that causes the flow of the fluid to be oriented the flow measurement element. This inclined surface is constituted by two or more surfaces with different orientations.

With the above configuration, it is possible to suppress dust from being bounced back by the inclined surface provided on the opposing surface on the upstream side of the pattern of the heating resistor of the fluid passage portion on the heating resistor pattern side and then flowing toward the pattern of the heat generating resistor together with the flow of the fluid. Thus, it is possible to suppress a breakage or contamination of the flow measurement element configured using the heating resistor pattern, and to provide a highly reliable flow measurement device which is excellent in dust resistance even in an unsteady flow field such as pulsating flow and in which a characteristic error hardly occurs (see paragraph 0009 and the like of the same literature).

CITATION LIST

Patent Literature

PTL 1: JP 2012-93203 A

SUMMARY OF INVENTION

Technical Problem

In the conventional thermal flowmeter, there is a risk that a flow velocity measured by the flow measurement element becomes lower than an actual flow velocity so that the measurement error may increase when a flow velocity of the fluid flowing through the first fluid passage portion becomes lower than a flow velocity of the fluid flowing through the second fluid passage portion during pulsation of the fluid. The present invention has been made in view of the above problem, and an object of the present invention is to provide a thermal flowmeter capable of reducing a measurement error at the time of pulsation of a fluid as compared with the related art.

Solution to Problem

In order to achieve the above object, a thermal flowmeter of the present invention is a thermal flowmeter including: a sub-passage that takes a part of a fluid flowing through a main passage; and a flow measurement unit that is disposed in the sub-passage. The sub-passage includes: a first passage provided on a measurement surface side of the flow measurement unit; a second passage provided on a back surface side of the flow measurement unit; and an inclined passage provided on an upstream side of an inlet of the first passage in a forward flow direction of the fluid in the first passage. The inclined passage includes a first inclined surface, which is inclined from a side of the second passage toward a side of the first passage with respect to the forward flow direction, to be closer to the side of the second passage than the flow measurement unit.

Advantageous Effects of Invention

According to the thermal flowmeter of the present invention, it is possible to deflect the fluid flowing through the sub-passage from the second passage side toward the first passage side at the time of pulsation of the fluid by the first inclined surface of the inclined passage provided on the upstream side in the forward flow direction of the inlet of the first passage. In this manner, the flow rate of the fluid flowing through the first passage in the forward flow direction is increased, a measured flow velocity is prevented from decreasing more than the conventional flow velocity, and it is possible to reduce the measurement error as compared with the related art.

BRIEF DESCRIPTION OF DRAWINGS

FIG. 12 is a schematic developed view of a sub-passage of a thermal flowmeter according to a second embodiment of the present invention.

DESCRIPTION OF EMBODIMENTS

Hereinafter, embodiments of a thermal flowmeter of the present invention will be described with reference to the drawings.

First Embodiment

Figure 1:
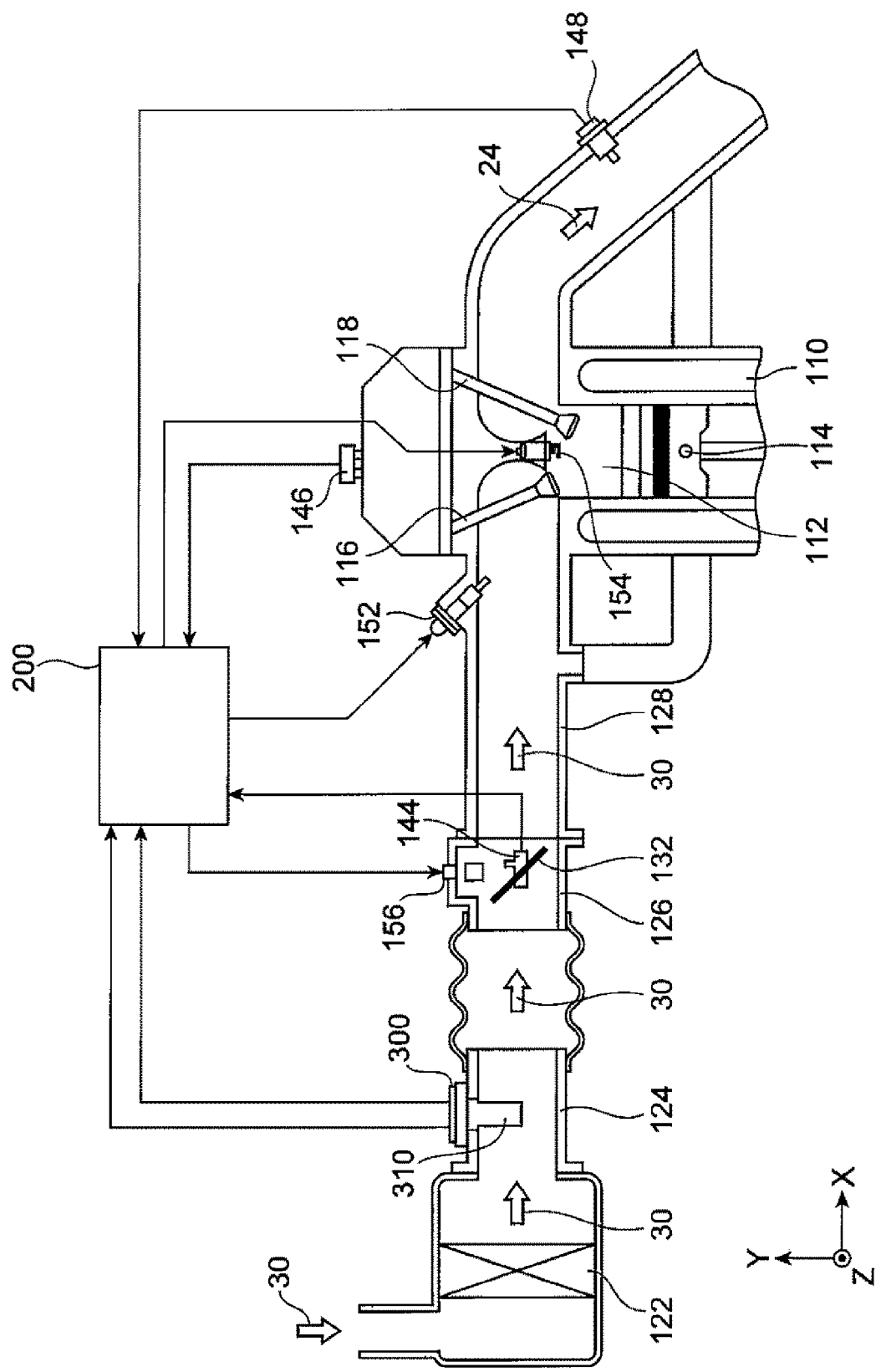
FIG. 1 is a schematic view illustrating an example of a system including a thermal flowmeter according to a first embodiment of the present invention.

FIG. 1 is a schematic view illustrating an example of an internal combustion engine control system of an electronic fuel injection scheme provided with a thermal flowmeter 300 according to the first embodiment of the present invention. In this system, intake air is sucked from an air cleaner 122 as a gas 30 to be measured on the basis of an operation of an internal combustion engine 110, which includes an engine cylinder 112 and an engine piston 114, and is guided to a combustion chamber of the engine cylinder 112 via, for example, an intake pipe as a main passage 124, a throttle body 126, and an intake pipe 128.

A flow rate of the gas 30 to be measured, which is the intake air guided to the combustion chamber, is measured by the thermal flowmeter 300, and fuel is supplied from a fuel injection valve 152 based on the measured flow rate, and is guided to the combustion chamber in the state as an air-fuel mixture with the gas 30 to be measured which is intake air. Incidentally, the fuel injection valve 152 is provided at an intake port of the internal combustion engine in the present embodiment, and the fuel injected to the intake port is mixed with the gas 30 to be measured as the intake air to form the air-fuel mixture. The air-fuel mixture is guided to the combustion chamber via an intake valve 116 and is burnt to generate mechanical energy.

The thermal flowmeter 300 can be used not only in the scheme of injecting fuel to the intake port of the internal combustion engine illustrated in FIG. 1 but also in a scheme of directly injecting fuel into each combustion chamber. In both the schemes, basic concepts of a control parameter measurement method including a method of using the thermal flowmeter 300 and an internal combustion engine control method including a fuel supply amount and an ignition timing are substantially the same, and FIG. 1 illustrates the scheme of injecting fuel to the intake port as a representative example of both the schemes.

The fuel and air guided to the combustion chamber are in the mixed state of fuel and air, and is explosively burnt by spark ignition of a spark plug 154, thereby generating the mechanical energy. After burning, the gas is guided into an exhaust pipe from an exhaust valve 118, and is discharged, as exhaust 24, outside a car from the exhaust pipe. A flow rate of the gas 30 to be measured as the intake air guided to the combustion chamber is controlled by a throttle valve 132 whose opening degree is changed based on an operation of an accelerator pedal. A supply amount of fuel is controlled on the basis of the flow rate of the intake air guided to the combustion chamber, and a driver can control the mechanical energy generated by the internal combustion engine by controlling the opening degree of the throttle valve 132 and controlling the flow rate of the intake air guided to the combustion chamber.

A flow rate and a temperature of the gas 30 to be measured, which is the intake air taken from the air cleaner 122 and flowing through the main passage 124, are measured by the thermal flowmeter 300, and electrical signals indicating the measured flow rate and temperature of the intake air are input from the thermal flowmeter 300 to a control device 200. In addition, an output of a throttle angle sensor 144, which measures the opening degree of the throttle valve 132, is input to the control device 200. Further an output of a rotation angle sensor 146 is input to the control device 200 in order to measure a position or a state of the engine piston 114, the intake valve 116, or the exhaust valve 118 of the internal combustion engine, and rotation speed of the internal combustion engine. An output of an oxygen sensor 148 is input to the control device 200 in order to measure a state of a mixing ratio between the amount of fuel and the amount of air based on the state of the exhaust 24.

The control device 200 calculates the fuel injection amount and the ignition timing based on, for example, the flow rate, humidity, and temperature of the intake air, which are outputs of the thermal flowmeter 300, and the rotation speed of the internal combustion engine from the rotation angle sensor 146, and the like. The fuel amount to be supplied from the fuel injection valve 152 and the ignition timing ignited by the spark plug 154 are controlled based on these calculation results. In practice, the fuel supply amount and the ignition timing are controlled based on the temperature of intake air measured by the thermal flowmeter 300, a change state of a throttle angle, a change state of the engine rotation speed, a state of an air-fuel ratio measured by the oxygen sensor 148. The control device 200 further controls the amount of air bypassing the throttle valve 132 using an idle air control valve 156 in an idle operation state of the internal combustion engine and controls the rotation speed of the internal combustion engine in the idle operation state.

Both the fuel supply amount and the ignition timing, which are major controlled quantities of the internal combustion engine, are calculated using the output of the thermal flowmeter 300 as the main parameter. Therefore, improvement of measurement accuracy of the thermal flowmeter 300, suppression of a change over time, and improvement of reliability are important in regard to improvement of control accuracy of a vehicle and securing of reliability. In particular, recently, a request for fuel saving of vehicles has extremely increased, and further, a request for purification of an exhaust gas has extremely increased. In order to respond to such requests, it is extremely important to improve the measurement accuracy of the flow rate of the gas 30 to be measured which is the intake air measured by the thermal flowmeter 300.

Figure 2A:
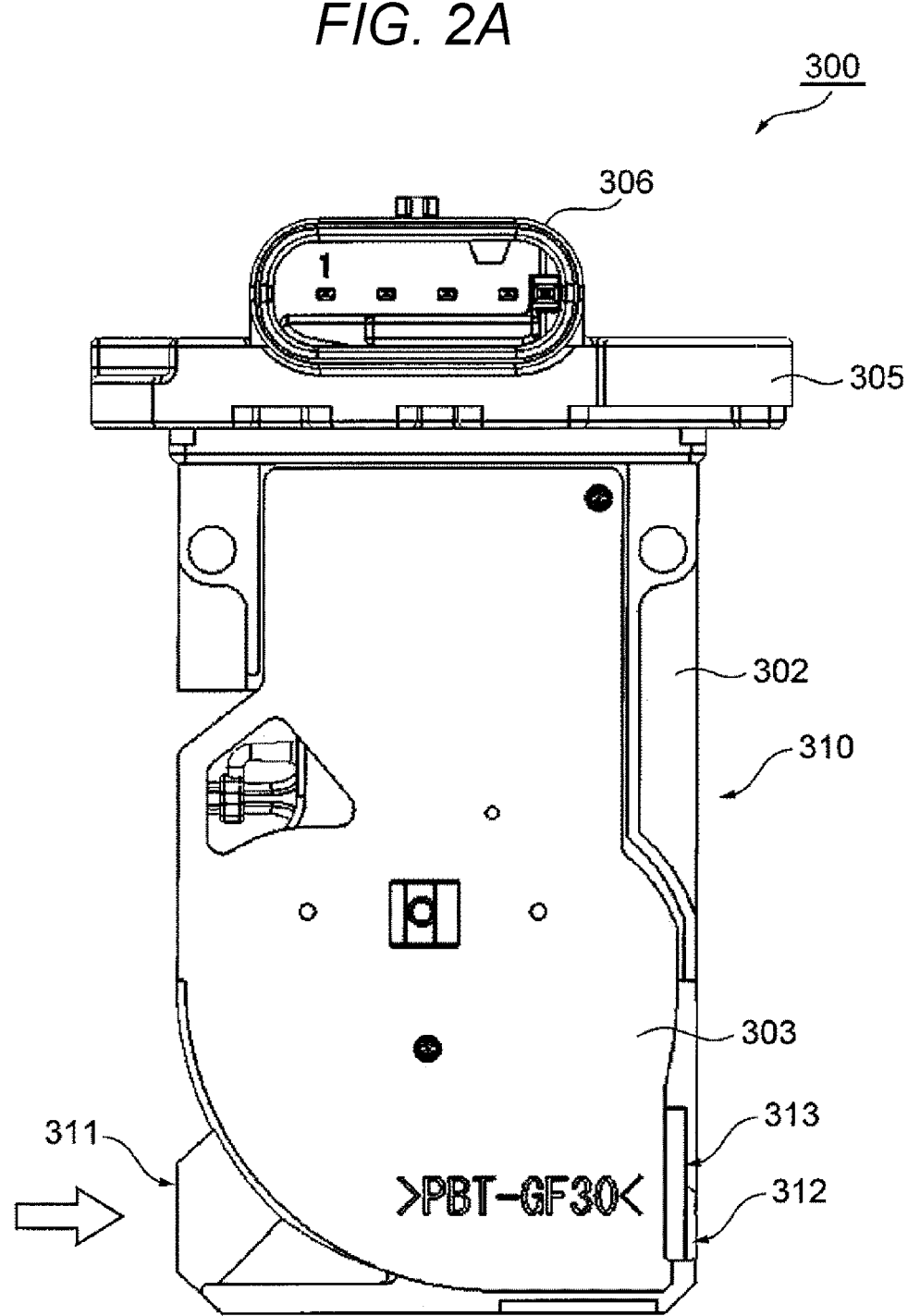
FIG. 2A is a front view of the thermal flowmeter according to the first embodiment of the present invention.
Figure 2B:
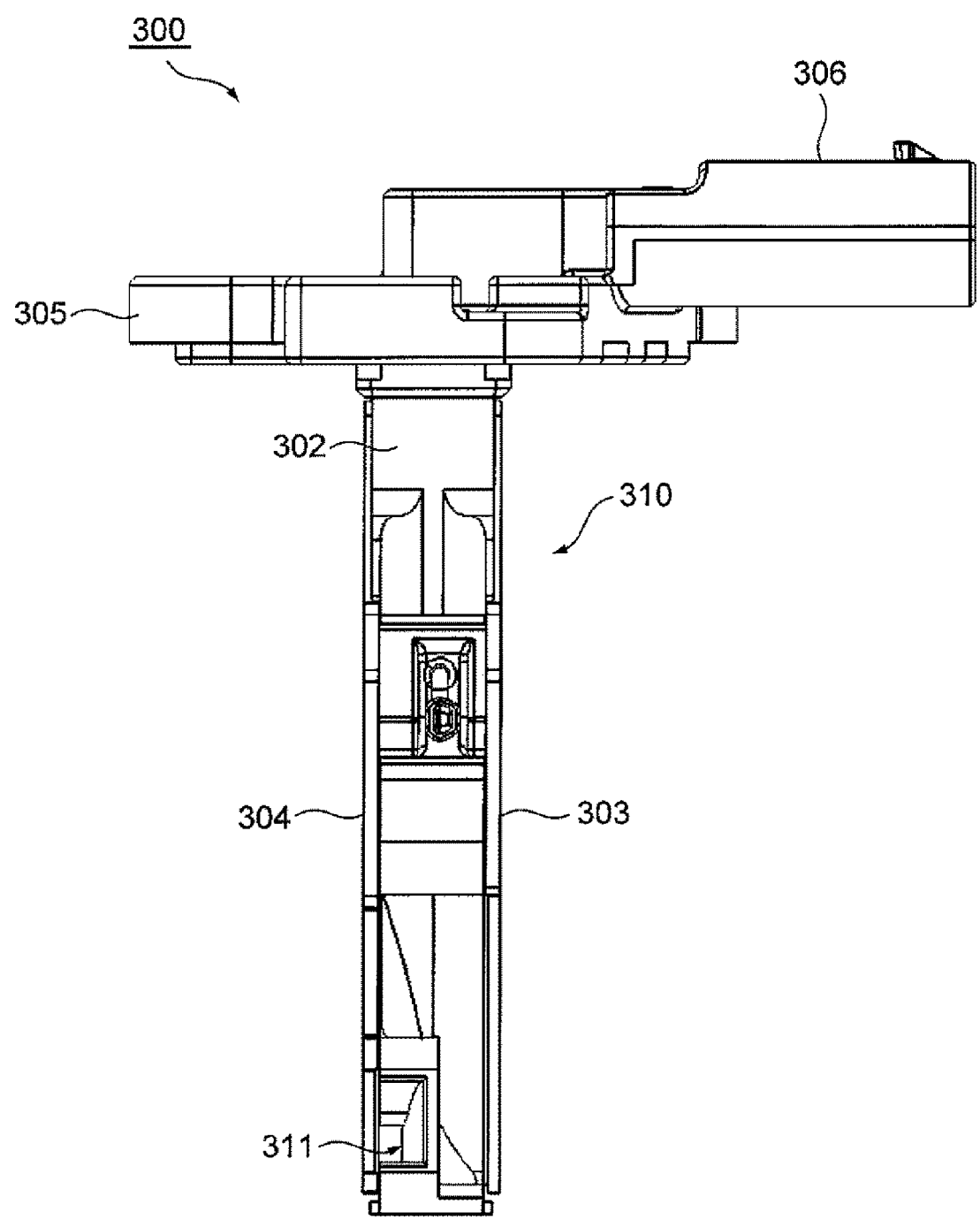
FIG. 2B is a left side view of the thermal flowmeter illustrated in FIG. 2A.
Figure 2C:
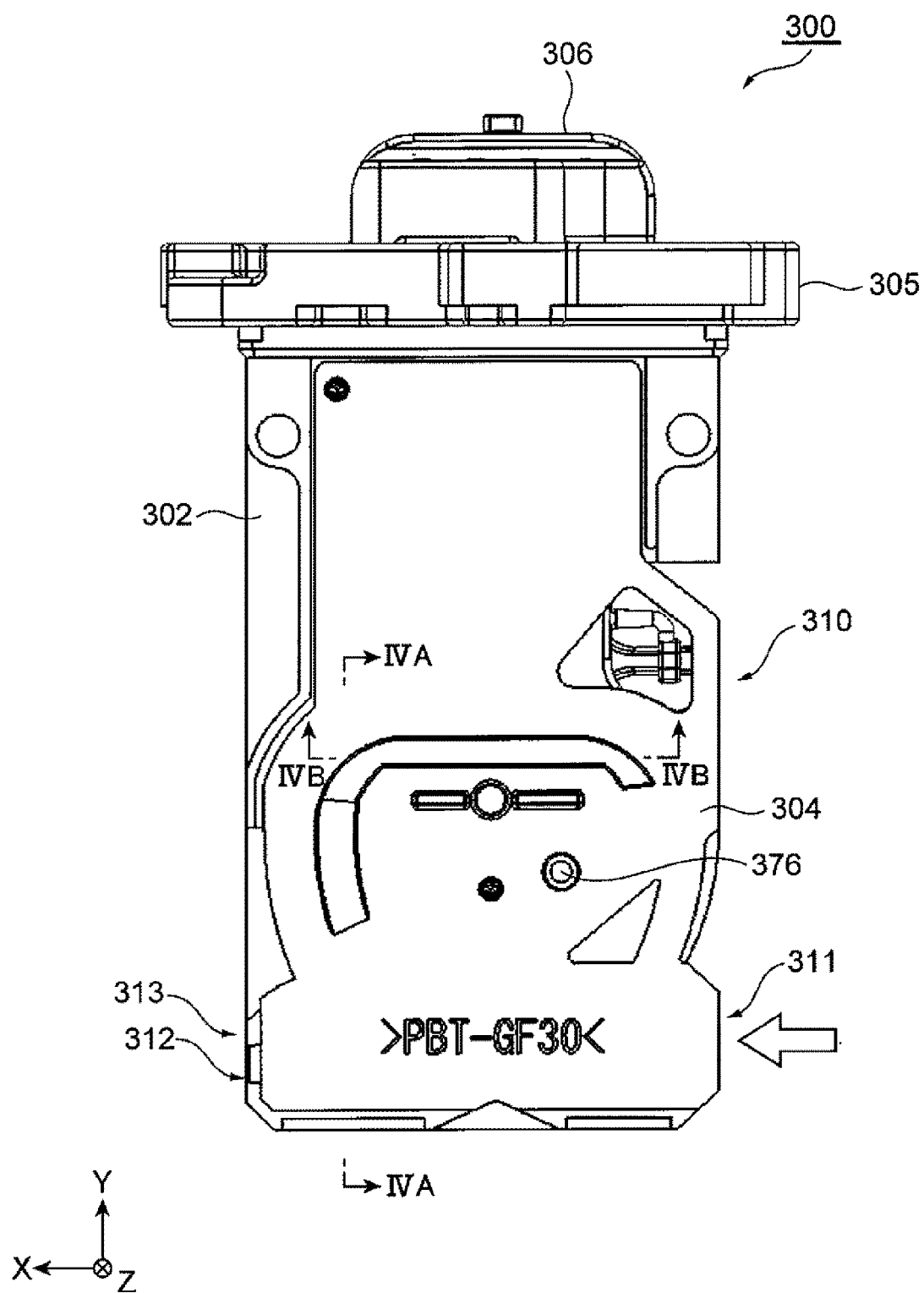
FIG. 2C is a rear view of the thermal flowmeter illustrated in FIG. 2A.
Figure 2D:
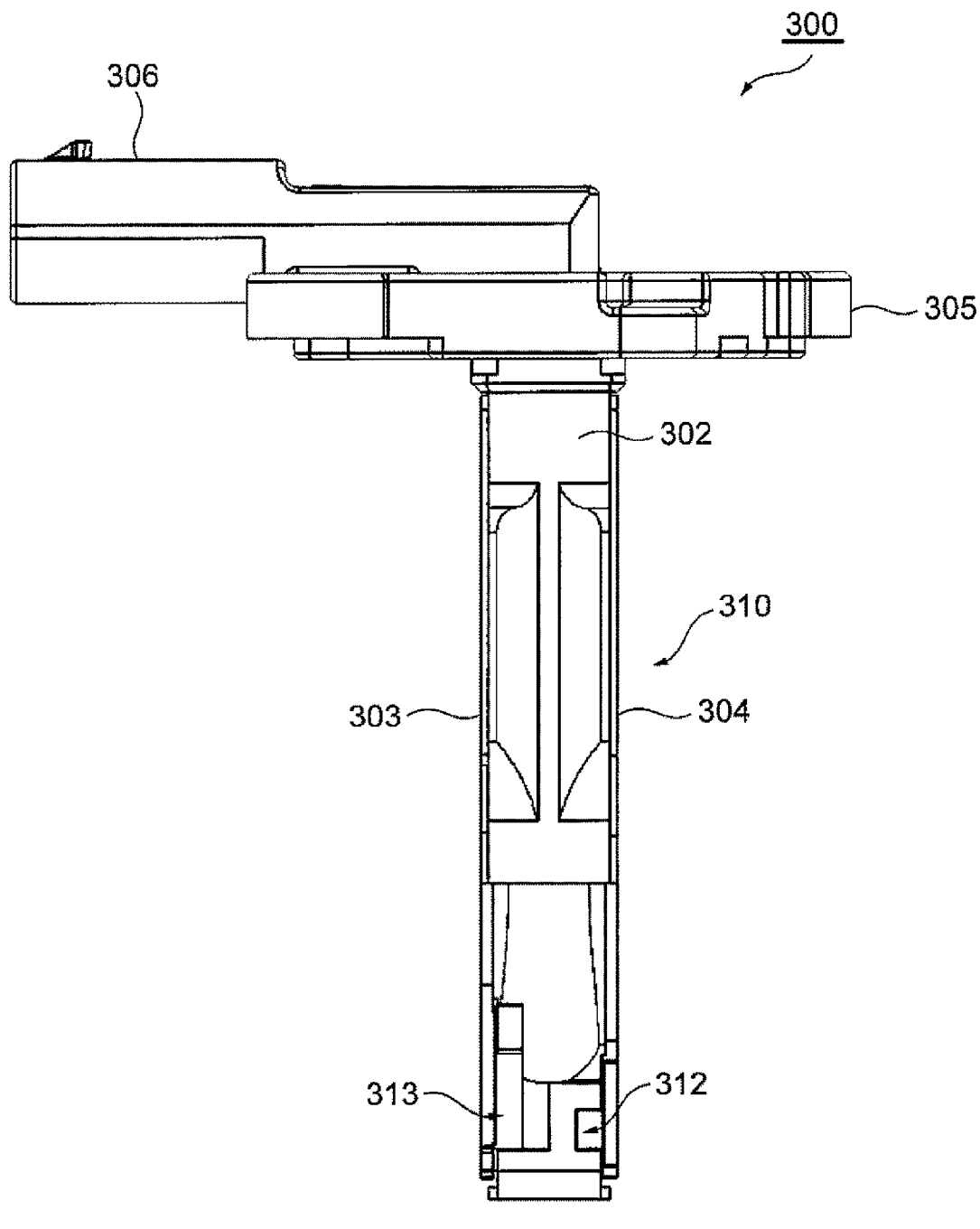
FIG. 2D is a right side view of the thermal flowmeter illustrated in FIG. 2A.

FIG. 2A is a front view of the thermal flowmeter 300 according to the present embodiment. FIGS. 2B, 2C, and 2D are a left side view, a rear view, and a right side view of the thermal flowmeter illustrated in FIG. 2A, respectively.

The thermal flowmeter 300 includes a casing 310 constituted by a housing 302, a front cover 303, and a back cover 304. The front cover 303 and the back cover 304 are formed in a thin plate shape and have a wide flat cooling surface. Thus, the thermal flowmeter 300 has a structure in which air resistance is reduced and the casing 310 is more likely to be cooled by the gas to be measured flowing through the main passage 124.

The casing 310 has, for example, a substantially rectangular parallelepiped flat shape and is inserted into the intake pipe and disposed inside the main passage 124 as illustrated in FIG. 1. Although details will be described later, the casing 310 defines a sub-passage that takes a part of the gas 30 to be measured which is a fluid flowing through the main passage 124.

Incidentally, hereinafter, each unit of the thermal flowmeter 300 will be sometimes described using an XYZ orthogonal coordinate system in which a length direction of the casing 310 substantially parallel to the flow of the gas 30 to be measured in the main passage 124 is an X-axis direction, a height direction of the casing 310 perpendicular to the length direction and substantially parallel to a radial direction of the main passage 124 is a Y-axis direction, and a thickness direction of the casing 310 perpendicular to the length direction and the height direction is a Z-axis direction.

The casing 310 has a shape that extends to be long along an axis from an outer wall of the main passage 124 to the center, and has a flat shape with a small thickness as illustrated in FIGS. 2B and 2D. That is, the casing 310 of the thermal flowmeter 300 has a shape in which the thickness along the side surface is thin and a front surface is substantially rectangular. As a result, the thermal flowmeter 300 can have the sub-passage with a sufficient length by reducing fluid resistance with respect to the gas 30 to be measured.

A flange 305, configured to fix the thermal flowmeter 300 to the intake pipe, and a connector 306, which is an external connection portion exposed to the outside of the intake pipe for electrical connection with an external device, are provided on a proximal end portion of the housing 302. The housing 302 is supported in a cantilever manner by fixing the flange 305 to the intake pipe.

Figure 3A:
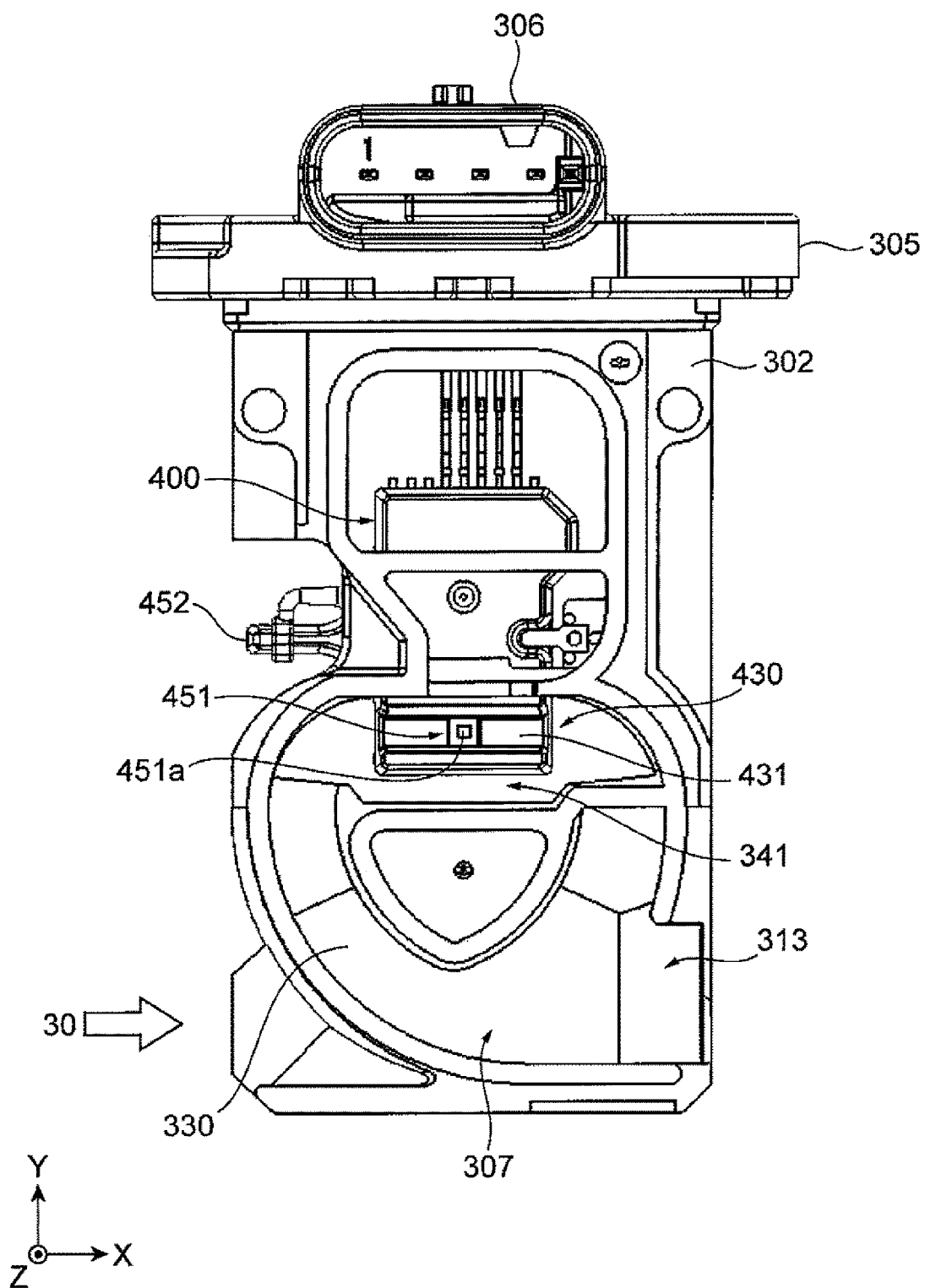
FIG. 3A is a front view of the thermal flowmeter illustrated in FIG. 2A in a state where a front cover is removed therefrom.
Figure 3B:
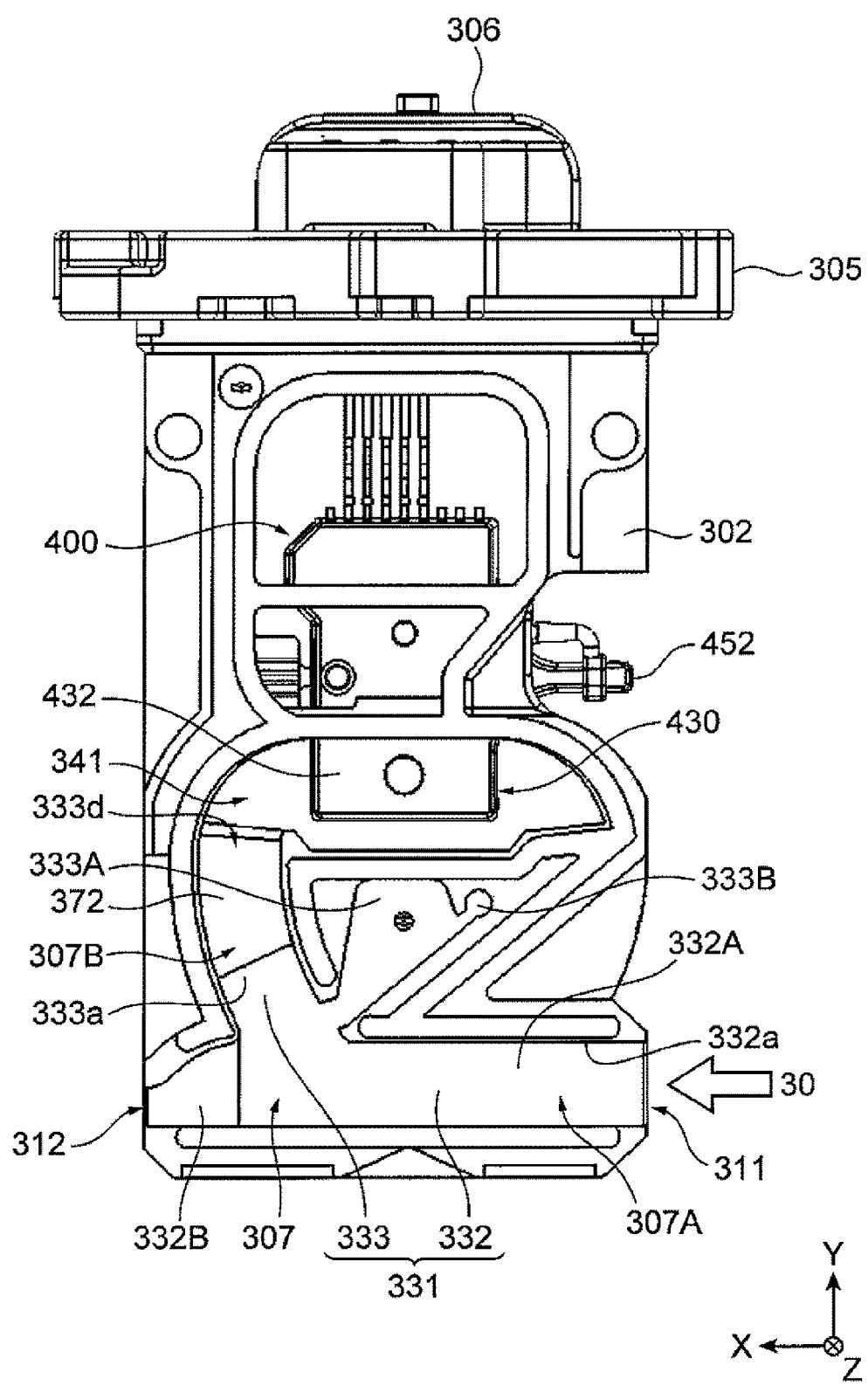
FIG. 3B is a rear view of the thermal flowmeter illustrated in FIG. 2C in a state where a back cover is removed therefrom.

FIG. 3A is a front view of the thermal flowmeter 300 illustrated in FIG. 2A in a state where the front cover 303 is removed therefrom. FIG. 3B is a rear view of the thermal flowmeter 300 illustrated in FIG. 2C in a state where the back cover 304 is removed therefrom.

An inlet 311, configured to take a part of the gas 30 to be measured such as intake air which is the fluid flowing through the main passage 124 into a sub-passage 307, is provided at a position on a distal end side of the housing 302 and on an upstream side in a main flow direction. In this manner, the inlet 311, configured to take the gas 30 to be measured flowing through the main passage 124 into the sub-passage 307, is provided on the distal end side of the casing 310 extending from the flange 305 toward the center direction in the radial direction of the main passage 124.

As a result, a gas at a portion distant from an inner wall surface of the main passage 124 can be taken into the sub-passage 307, it is possible to suppress a decrease in measurement accuracy of a flow rate and a temperature of the gas since it is hardly affected by a temperature of the inner wall surface of the main passage 124. In addition, the fluid resistance is large near the inner wall surface of the main passage 124, and a flow velocity becomes lower than an average flow velocity of the main passage 124. Since the inlet 311 is provided at the distal end portion of the thin and long casing 310 extending from the flange 305 toward the center of the main passage 124 in the thermal flowmeter 300 of the present embodiment, it is possible to take a gas having a high flow velocity at a central portion of the main passage 124 into the sub-passage 307.

A first outlet 312 and a second outlet 313, configured to return the gas 30 to be measured from the sub-passage 307 to the main passage 124, are provided at the distal end side of the housing 302 and on a downstream side in the main flow direction. As illustrated in FIG. 2D, the first outlet 312 and the second outlet 313 are disposed side by side in the thickness direction (Z-axis direction) of the housing 302. As the first outlet 312 and the second outlet 313, which are discharge ports of the sub-passage 307, are provided at the distal end portion of the casing 310 in this manner, it is possible to return the gas flowing in the sub-passage 307 to the vicinity of the central portion of the main passage 124 where the flow velocity is high.

A circuit package 400, which includes a flow measurement unit 451 configured to measure a flow rate of the gas 30 to be measured flowing through the main passage 124 and a temperature measurement unit 452 configured to measure a temperature of the gas 30 to be measured flowing through the main passage 124, and the like, is integrally molded in the housing 302. In addition, sub-passage grooves 330 and 331 configured to define the sub-passage 307 are formed in the housing 302. In the present embodiment, the sub-passage grooves 330 and 331 are recessed on a front surface and a back surface of the housing 302, respectively.

Thus, it is possible to form the casing 310 defining the sub-passage 307 by attaching the front cover 303 and the back cover 304 to the front surface and the back surface of the housing 302 to cover the sub-passage grooves 330 and 331 of the housing 302 with the front cover 303 and the back cover 304, respectively. Regarding the housing 302 having such a configuration, for example, molding of the housing 302 and formation of the sub-passage grooves 330 and 331 on the front and back surfaces can be performed at once in a resin molding step of molding the housing 302 using molds disposed on both the surfaces of the housing 302.

As illustrated in FIG. 3B, the sub-passage grooves 331 provided on the back side of the housing 302 have a straight groove portion 332 configured to define a straight passage 307A in a part of the sub-passage 307 and a branch groove portion 333 configured to define a branch passage 307B in a part of the sub-passage 307.

The straight groove portion 332 extends in a straight line along the main flow direction (X-axis positive direction) of the gas 30 to be measured at the distal end portion of the housing 302 such that one end thereof communicates with the inlet 311 of the housing 302 and the other end communicates with the first outlet 312 of the housing 302. The straight groove portion 332 has a straight portion 332A extending from the inlet 311 so as to have a substantially constant cross-sectional shape, and a throttle portion 332B in which a groove width gradually narrows as moving from the straight portion 332A toward the first outlet 312. The first outlet 312 serves as the discharge port for discharging a fluid flowing through the straight passage 307A of the sub-passage 307, that is, a part of the gas 30 to be measured. Foreign matters such as dust are discharged from the sub-passage 307 to the outside by installing the first outlet 312 so that it is possible to reduce the total amount of foreign matters taken into the branch passage 307B of the sub-passage 307 and to prevent degradation of measurement performance of the flow measurement unit 451.

The branch groove portion 333 branches from the straight portion 332A of the straight groove portion 332, advances toward the proximal end side of the housing 302 while curving, and communicates with a measurement flow path 341 provided at a central portion in a height direction (Y-axis direction) which is the longitudinal direction of the housing 302. An upstream end of the branch groove portion 333 communicates with a side wall surface 332a positioned on the proximal end side of the housing 302 among a pair of side wall surfaces forming the straight groove portion 332, and a bottom wall surface 333a is continuous to be flush with a bottom wall surface of the straight portion 332A of the straight groove portion 332 without any step.

An accommodating groove portion 333A is provided on a side wall surface on an inner side of the curve of the branch groove portion 333. The accommodating groove portion 333A has a concave portion 333B. The concave portion 333B takes water that has entered the accommodating groove portion 333A, and the water is discharged to the outside of the casing 310 from a drain hole 376 bored at a position opposing the concave portion 333B of the back cover 304 as illustrated in FIG. 2C.

The measurement flow path 341 is formed by penetrating the housing 302 from the front side to the back side in the thickness direction. A flow path exposure portion 430 of the circuit package 400 is disposed so as to protrude in the measurement flow path 341. The branch groove portion 333 communicates with the measurement flow path 341 on the upstream side of the sub-passage 307 with respect to the flow path exposure portion 430 of the circuit package 400.

In the thermal flowmeter 300 of the present embodiment, the sub-passage groove 331 defining the sub-passage 307 has a steeply-inclined portion 333d, which defines an inclined passage to be described later, on the upstream side of the flow of the gas 30 to be measured in the measurement flow path 341. More specifically, the branch groove portion 333 of the sub-passage groove 331, which defines the branch passage 307B of the sub-passage 307, extends while curving in a direction (X-axis negative direction) opposite to the main flow direction of the gas 30 to be measured in the main passage 124, from the straight groove portion 332 toward the measurement flow path 341 in the height direction (Y-axis direction) of the housing 302.

The branch passage 307B of the sub-passage 307 defined by the branch groove portion 333 is provided with the measurement flow path 341, oriented from the distal end side of the housing 302 toward the proximal end side which is the flange 305 side while drawing a curve, at a position which is the closest to the flange 305. In the measurement flow path 341, the gas 30 to be measured flowing through the sub-passage 307 flows in the direction (X-axis negative direction) opposite to the main flow direction of the main passage 124.

Figure 4A:
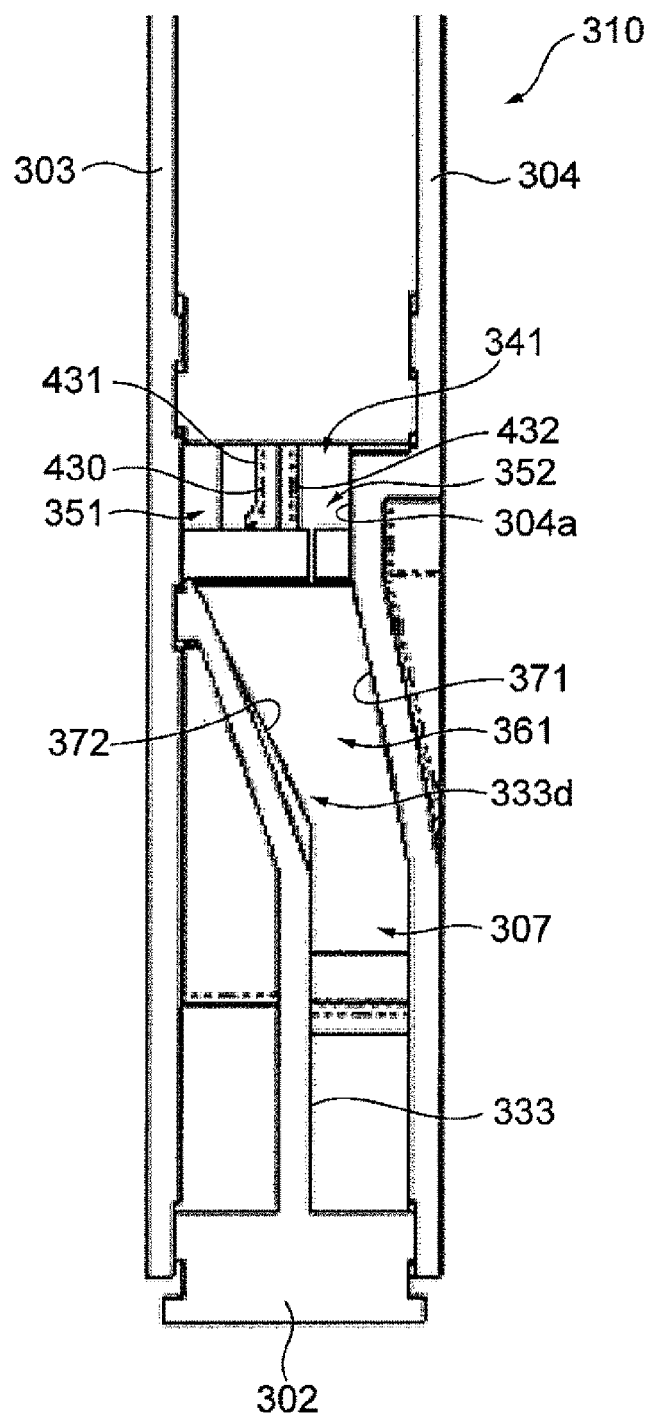
FIG. 4A is a cross-sectional view taken along a line IVA-IVA of the thermal flowmeter illustrated in FIG. 2C.

In the thermal flowmeter 300 of the present embodiment, the branch groove portion 333 has a three-dimensional shape in which a groove depth in the thickness direction (Z-axis direction) of the housing 302 becomes gradually deeper toward the measurement flow path 341 (see FIG. 4A). In the thermal flowmeter 300 of the present embodiment, the branch groove portion 333 has the steeply-inclined portion 333d that is steeply deepened in front of the measurement flow path 341.

In the measurement flow path 341, the steeply-inclined portion 333d serves a function of allowing a gas of the gas 30 to be measured to pass through a front surface 431 side on which the measurement surface 451a of the flow measurement unit 451 is provided between the front surface 431 and a back surface 432 of the flow path exposure portion 430 of the circuit package 400. Further, the steeply-inclined portion 333d allows foreign matters such as dust contained in the gas 30 to be measured to pass through the back surface 432 side of the flow path exposure portion 430 of the circuit package 400, which is the back surface side of the flow measurement unit 451, thereby improving contamination resistance of the measurement surface 451a of the flow measurement unit 451.

More specifically, a part of air having a small mass moves along the steeply-inclined portion 333d, and flows through a first passage 351 (see FIG. 4B) on the front surface 431 side of the flow path exposure portion 430 of the circuit package 400, that is, on the measurement surface 451a side of the flow measurement unit 451 in the measurement flow path 341. On the other hand, it is difficult for the foreign matters having a large mass to suddenly change a course due to a centrifugal force along the curve of the branch passage 307B of the sub-passage 307. Thus, it is difficult for the foreign matters having a large mass to flow along the steeply-inclined portion 333d, but flows through a second passage 352 (see FIG. 4B) on the back surface 432 side of the flow path exposure portion 430 of the circuit package 400, that is, on the back surface 451b side of the flow measurement unit 451.

The sub-passage groove 330 provided on the front side of the housing 302 illustrated in FIG. 3A defines a portion of the sub-passage 307 on the downstream side of the branch passage 307B. The portion of the downstream side of the branch passage 307B, which is defined by the sub-passage groove 330 has one end communicating with a portion on the upstream side of the branch passage 307B on the back side of the housing 302 via the measurement flow path 341 and the other end communicating with the second outlet 313 formed on the distal end side of the housing 302.

The sub-passage groove 330 provided on the front side of the housing 302 has such a shape as to gradually curve so as to advance toward the downstream side in the main flow direction as moving toward the distal end side of the housing 302, to linearly extend toward the downstream side in the main flow direction of the gas 30 to be measured at the distal end portion of the housing 302, and to have the groove width gradually narrowed toward the second outlet 313. The gas 30 to be measured and the foreign matter that have passed through the measurement flow path 341 flow through a downstream portion of the branch passage 307B of the sub-passage 307 defined by the sub-passage groove 330 provided on the front side of the housing 302, and are discharged from the second outlet 313 and returned to the main passage 124.

The flow path exposure portion 430 of the circuit package 400 protrudes inside the measurement flow path 341 from a wall surface of the branch groove portion 333 of the sub-passage groove 331 defining the measurement flow path 341 toward the distal end side of the housing 302 in the height direction (Y-axis direction) of the housing 302. The flow path exposure portion 430 has a thickness, in the thickness direction (Z-axis direction) of the housing 302 and is formed in a rectangular plate shape along the flow direction of the gas 30 to be measured flowing through the measurement flow path 341. The flow path exposure portion 430 serves a role as a supporting portion that supports the flow measurement unit 451 to dispose the flow measurement unit 451 in the sub-passage 307.

Figure 4B:
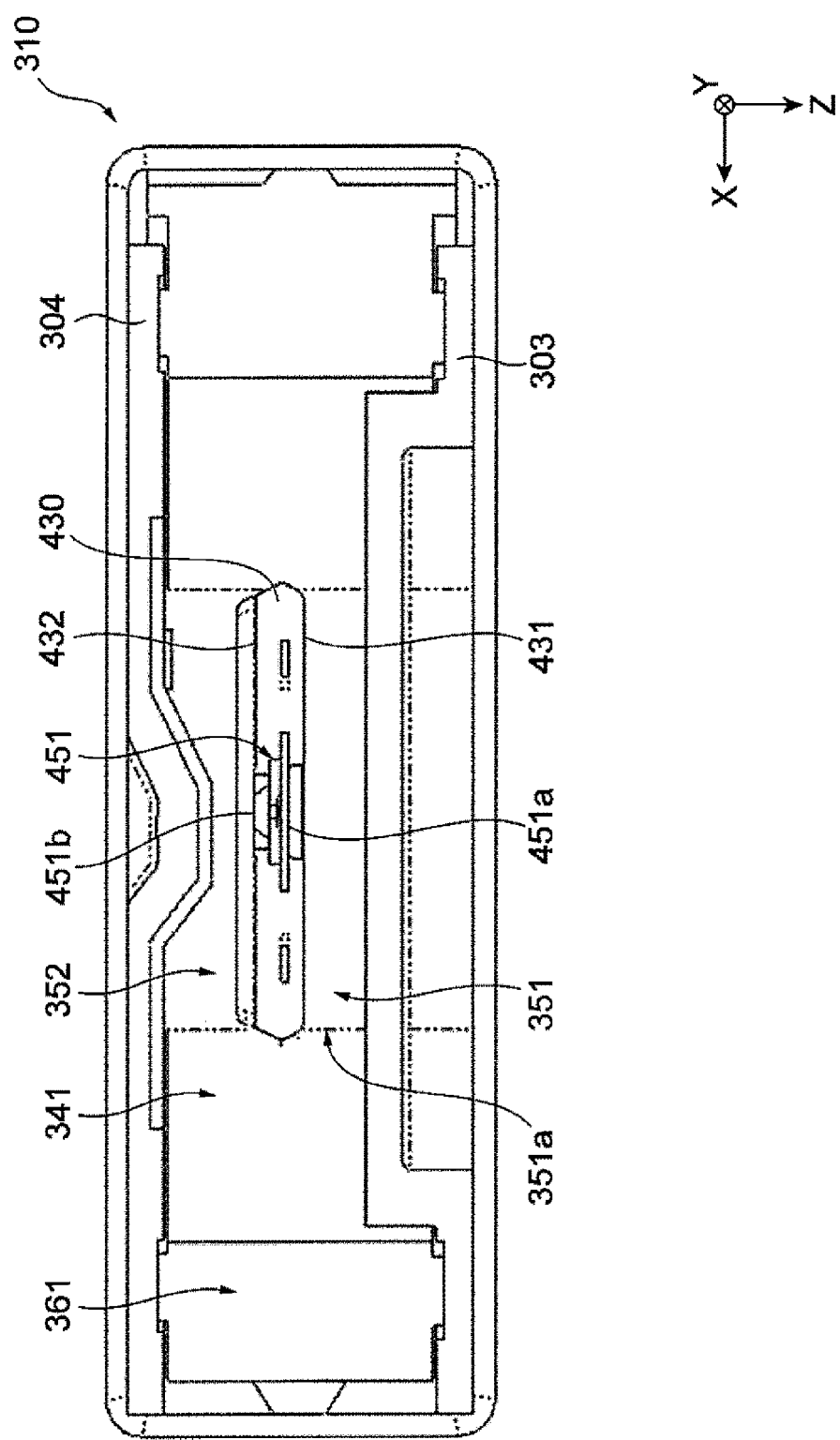
FIG. 4B is a cross-sectional view taken along a line IVB-IVB of the thermal flowmeter illustrated in FIG. 2C.

FIG. 4A is a cross-sectional view taken along a line IVA-IVA of the thermal flowmeter 300 illustrated in FIG. 2C. FIG. 4B is a cross-sectional view taken along a line IVB-IVB of the thermal flowmeter 300 illustrated in FIG. 2C.

The sub-passage 307 has the first passage 351 provided on the measurement surface 451a side of the flow measurement unit 451 in the measurement flow path 341 and the second passage 352 provided on the back surface 451b side of the flow measurement unit 451. In addition, the sub-passage 307 has the inclined passage 361 provided on the upstream side of the inlet 351a of the first passage 351 in the forward flow direction F of the fluid in the first passage 351, that is, in the forward flow direction F of the gas 30 to be measured in the first passage 351.

The air, which is the gas 30 to be measured flows along the forward flow direction F of the gas 30 to be measured in the first passage 351 of the measurement flow path 341. At this time, heat is transferred to the gas 30 to be measured via the measurement surface 451a which is a heat transfer surface provided in the flow measurement unit 451, thereby measuring the flow rate. Incidentally, a general measurement principle as a thermal flowmeter can be used as a principle of such flow rate measurement. The configuration of the flow measurement unit 451 is not particularly limited as long as it is possible to measure the flow rate of the gas 30 to be measured flowing through the main passage 124 based on a measurement value measured by the flow measurement unit 451 as in the thermal flowmeter 300 of the present embodiment.

The thermal flowmeter 300 of the present embodiment is characterized by the inclined passage 361 provided on the upstream side of the inlet 351a of the first passage 351, provided on the measurement surface 451a side of the flow measurement unit 451, in the forward flow direction F of the gas 30 to be measured in the first passage 351, in the measurement flow path 341 of the sub-passage 307. The inclined passage 361 includes the first inclined surface 371, which is inclined from the second passage 352 side toward the first passage 351 side with respect to the forward flow direction F of the gas 30 to be measured, to be closer to the second passage 352 side than the flow measurement unit 451.

Incidentally, the thermal flowmeter 300 of the present embodiment includes the flat casing 310 disposed in the main passage 124 and defining the sub-passage 307 as described above. However, the measurement surface 451a of the flow measurement unit 451 disposed in the sub-passage 307 is substantially perpendicular to the thickness direction (Z-axis direction) of the casing 310.

In the thermal flowmeter 300 of the present embodiment, the sub-passage 307 has the straight passage 307A that takes a part of the gas 30 to be measured which is the fluid flowing through the main passage 124 as described above (see FIG. 3B). In addition, the sub-passage 307 has the first outlet 312 which is the discharge port to discharge a part of the gas 30 to be measured which is the fluid flowing through the straight passage 307A, and the branch passage 307B branching from the straight passage 307A on the upstream side of the first outlet 312 in the forward flow direction of the fluid flowing through the straight passage 307A. All the first passage 351, the second passage 352, and the inclined passage 361 described above are provided in the branch passage 307B.

Figure 5:
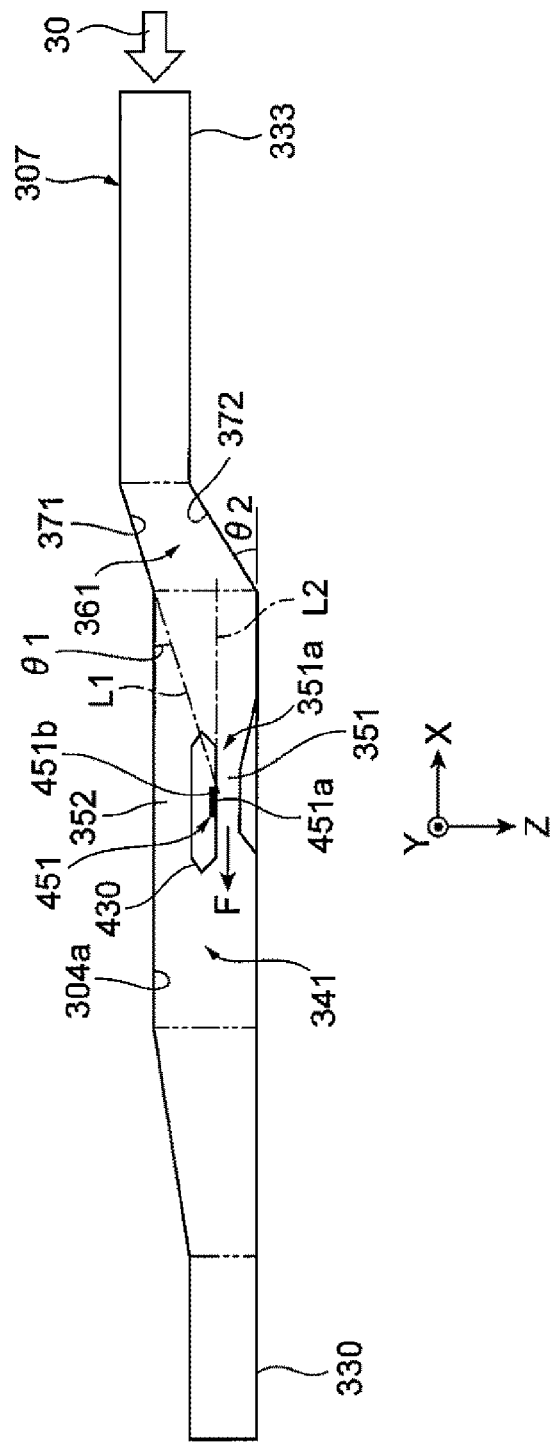
FIG. 5 is a schematic developed view of a sub-passage of the thermal flowmeter illustrated in FIGS. 4A and 4B.

FIG. 5 is a schematic developed view of the sub-passage 307 of the thermal flowmeter 300 illustrated in FIGS. 4A and 4B. In FIG. 5, a cross section along the thickness direction (Z-axis direction) of the casing 310 in front and rear portions of the measurement flow path 341 of the sub-passage 307 is expressed in the state of being developed as a cross section parallel to a thickness direction (Z-axis direction) and a length direction (X-axis direction) of the casing 310.

As described above, the thermal flowmeter 300 of the present embodiment includes: the sub-passage 307 that takes a part of the gas 30 to be measured which is the fluid flowing through the main passage 124, and the flow measurement unit 451 disposed inside the sub-passage 307. In addition, the sub-passage 307 includes: the first passage 351 provided on the measurement surface 451a side of the flow measurement unit 451; the second passage 352 provided on the back surface 451b side of the flow measurement unit 451; and the inclined passage 361 provided on the upstream side of the inlet 351a of the first passage 351 in the forward flow direction F of the gas 30 to be measured in the first passage 351. The inclined passage 361 includes the first inclined surface 371, which is inclined from the second passage 352 side toward the first passage 351 side with respect to the forward flow direction F of the gas 30 to be measured, to be closer to the second passage 352 side than the flow measurement unit 451.

Further, the inclined passage 361 has a second inclined surface 372 opposing the first inclined surface 371 in the direction (Z-axis direction) perpendicular to the measurement surface 451a of the flow measurement unit 451 in the example illustrated in FIG. 5. Similarly to the first inclined surface 371, the second inclined surface 372 is inclined from the second passage 352 side toward the first passage 351 side with respect to the forward flow direction F of the gas 30 to be measured. As illustrated in FIG. 3B, the second inclined surface 372 is provided at a bottom of the branch groove portion 333 of the housing 302, and forms the steeply-inclined portion 333d in the branch groove portion 333 of the housing 302.

In addition, in the example illustrated in FIG. 5, an inclination angle θ2 of the second inclined surface 372 with respect to the forward flow direction F of the gas 30 to be measured is larger than an inclination angle θ1 of the first inclined surface 371 with respect to the forward flow direction F of the gas 30 to be measured. More specifically, an angle difference between the inclination angle θ1 of the first inclined surface 371 and the inclination angle θ2 of the second inclined surface 372 can be set to be, for example, between 3° and 15°.

In addition, in the example illustrated in FIG. 5, a portion of the sub-passage 307 on the upstream side of the inclined passage 361 in the forward flow direction F of the gas 30 to be measured is provided on the second passage 352 side of the first passage 351 in the direction (Z-axis direction) perpendicular to the measurement surface 451a of the flow measurement unit 451.

In addition, an extension line L1 of the first inclined surface 371 and an extension line L2 of the measurement surface 451a intersect with each other on the upstream side of the measurement surface 451a in the forward flow direction F of the gas 30 to be measured in the cross section of the sub-passage 307 perpendicular to the measurement surface 451a of the flow measurement unit 451 in parallel with the forward flow direction F of the gas 30 to be measured in the example illustrated in FIG. 5. In addition, the extension line L1 of the first inclined surface 371 and the extension line L2 of the measurement surface 451a may intersect with each other on the upstream side of an upstream end portion of the flow path exposure portion 430 of the circuit package 400 as the supporting portion of the flow measurement unit 451, in the forward flow direction F of the gas 30 to be measured.

Figure 6A:
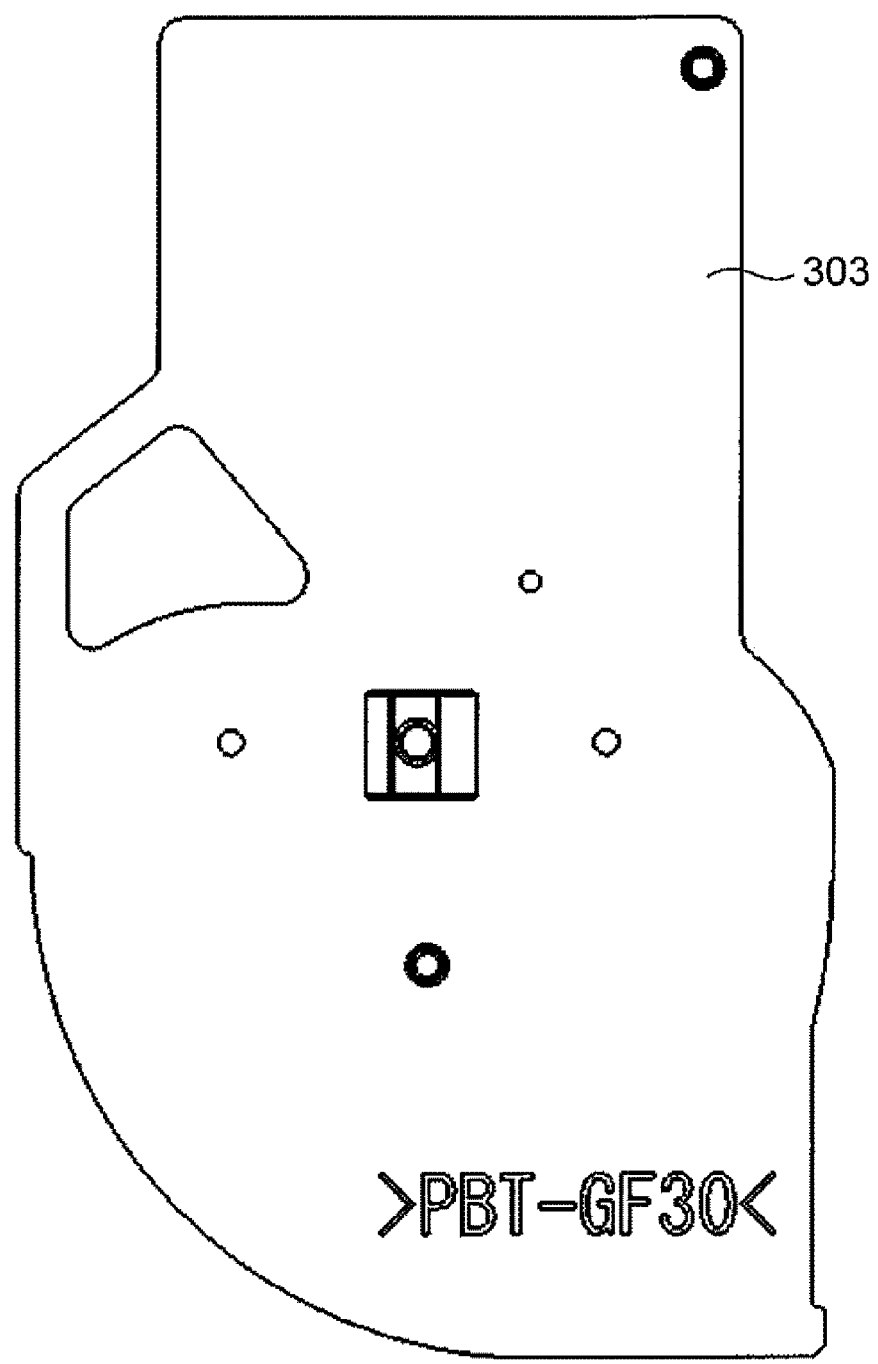
FIG. 6A is a front view of the front cover of the thermal flowmeter illustrated in FIG. 2A.
Figure 6B:
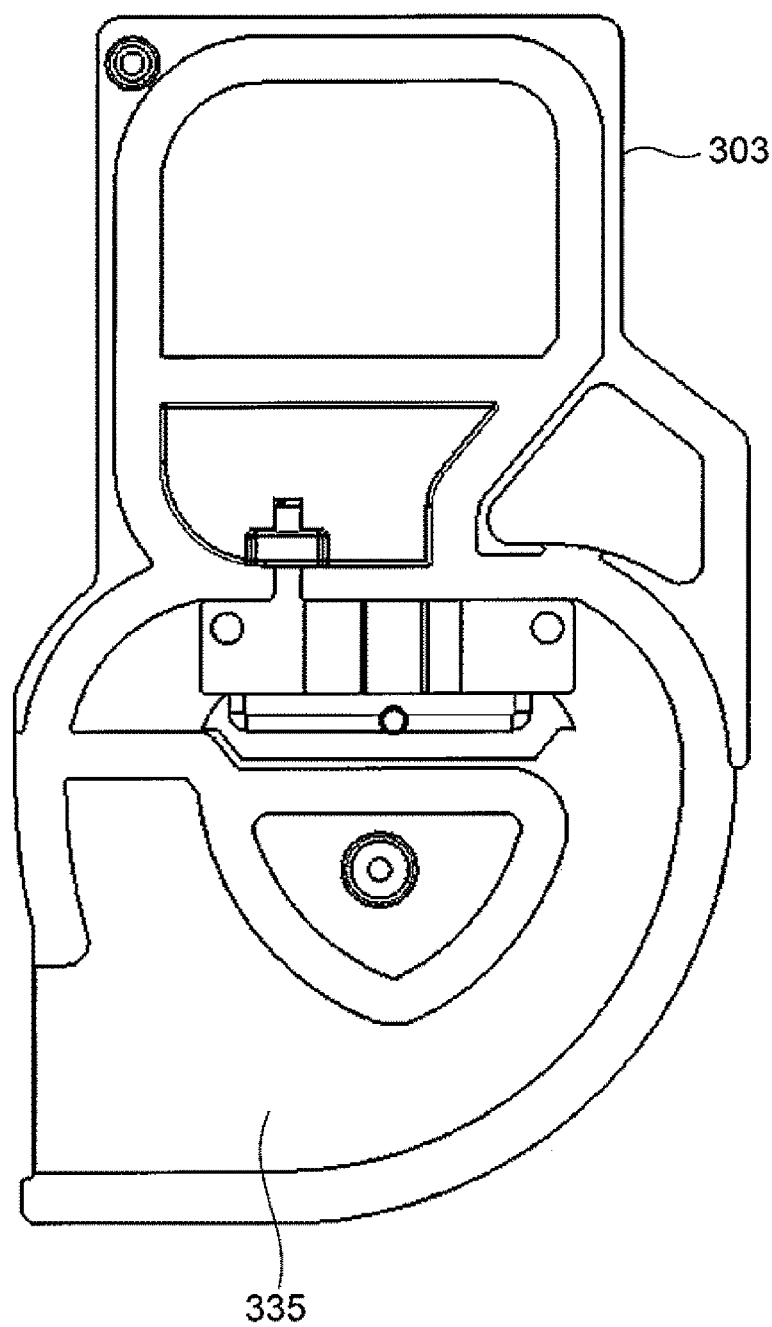
FIG. 6B is a rear view of the front cover of the thermal flowmeter illustrated in FIG. 6A.
Figure 7A:
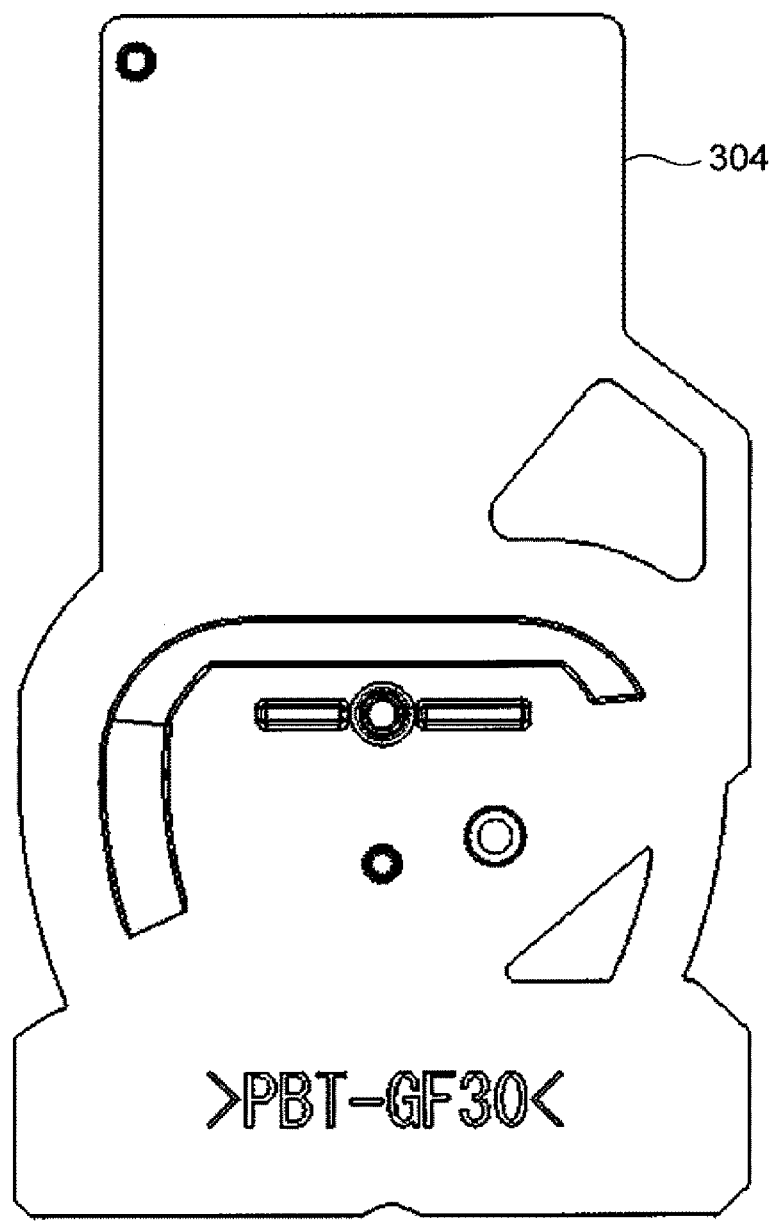
FIG. 7A is a front view of the back cover of the thermal flowmeter illustrated in FIG. 2C.
Figure 7B:
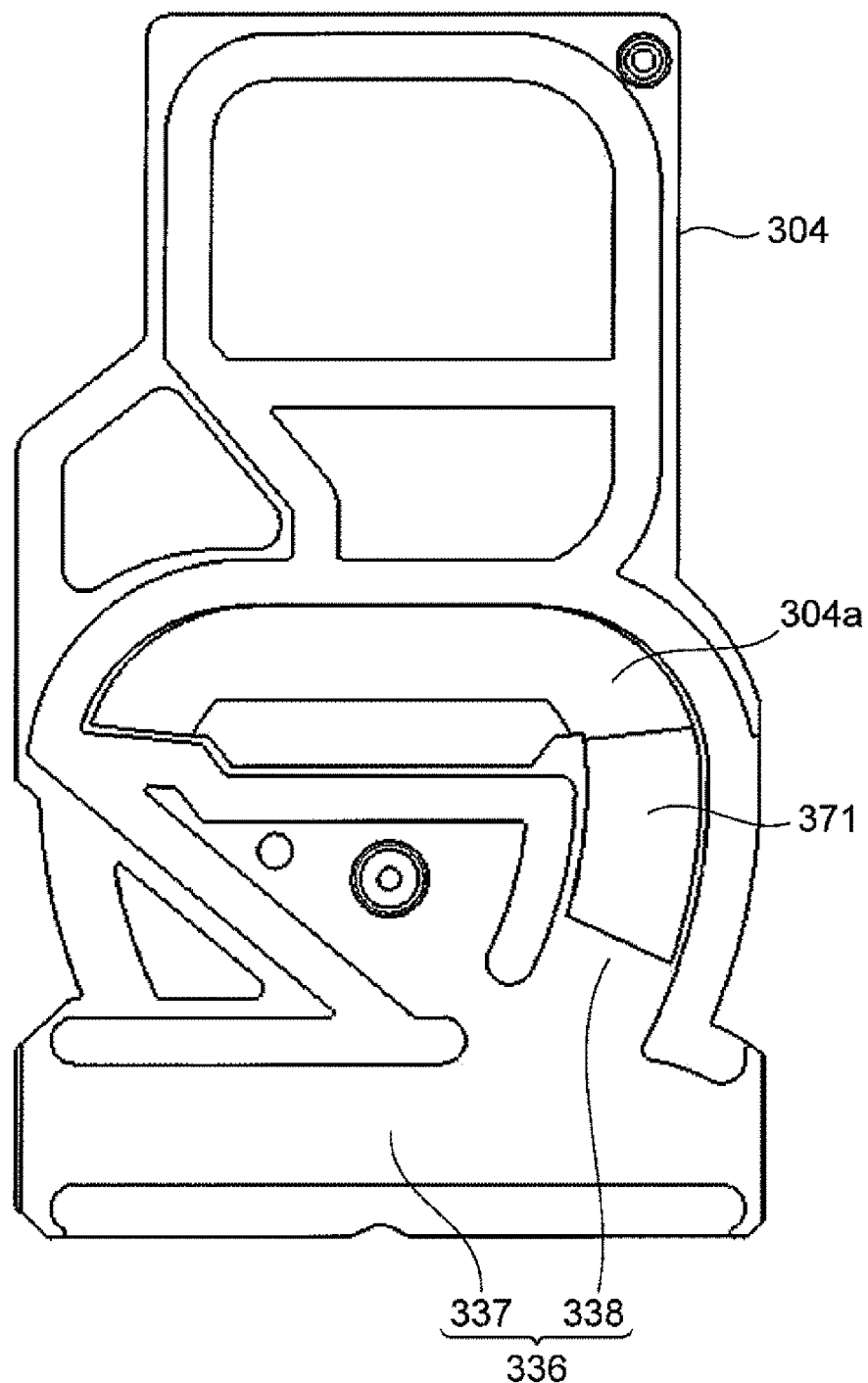
FIG. 7B is a rear view of the back cover of the thermal flowmeter illustrated in FIG. 7A.

FIGS. 6A and 6B are a front view and a rear view of the front cover 303 of the thermal flowmeter illustrated in FIG. 2A, respectively. FIGS. 7A and 7B are a front view and a rear view of the back cover 304 of the thermal flowmeter illustrated in FIG. 2C, respectively.

As described above, the front cover 303 and the back cover 304 are constituent members of the casing 310 that defines the sub-passage 307, and have sub-passage grooves 335 and 336 configured to define the sub-passage 307 at the rear side opposing the housing 302, respectively. The sub-passage groove 335 of the front cover 303 defines the measurement flow path 341 of the sub-passage 307 and the downstream portion thereof together with the sub-passage groove 330 of the housing 302 illustrated in FIG. 3A.

The sub-passage grooves 336 of the back cover 304 have a straight groove portion 337 configured to define the straight passage 307A in a part of the sub-passage 307 and a branch groove portion 338 configured to define the branch passage 307B in a part of the sub-passage 307, which is similar to the sub-passage grooves 331 provided on the back side of the housing 302 illustrated in FIG. 3B. The first inclined surface 371 of the inclined passage 361 illustrated in FIGS. 4A and 5 is provided at the bottom portion of the branch groove portion 338 of the back cover 304 illustrated in FIG. 7B. The first inclined surface 371 is continuously connected to a wall surface 304a provided at the bottom portion of the branch groove portion 338 of the back cover 304.

As illustrated in FIGS. 4A and 5, the wall surface 304a is provided so as to define the measurement flow path 341 of the sub-passage 307 and to face the second passage 352 on the back surface 451b side of the flow measurement unit 451. As the wall surface 304a that regulates a width of the second passage 352 in the thickness direction (Z-axis direction) of the casing 310 is provided in this manner, it is possible to improve the flow velocity of the gas 30 to be measured flowing through the measurement flow path 341.

Hereinafter, functions of the thermal flowmeter 300 of the embodiment will be described.

Figure 8A:
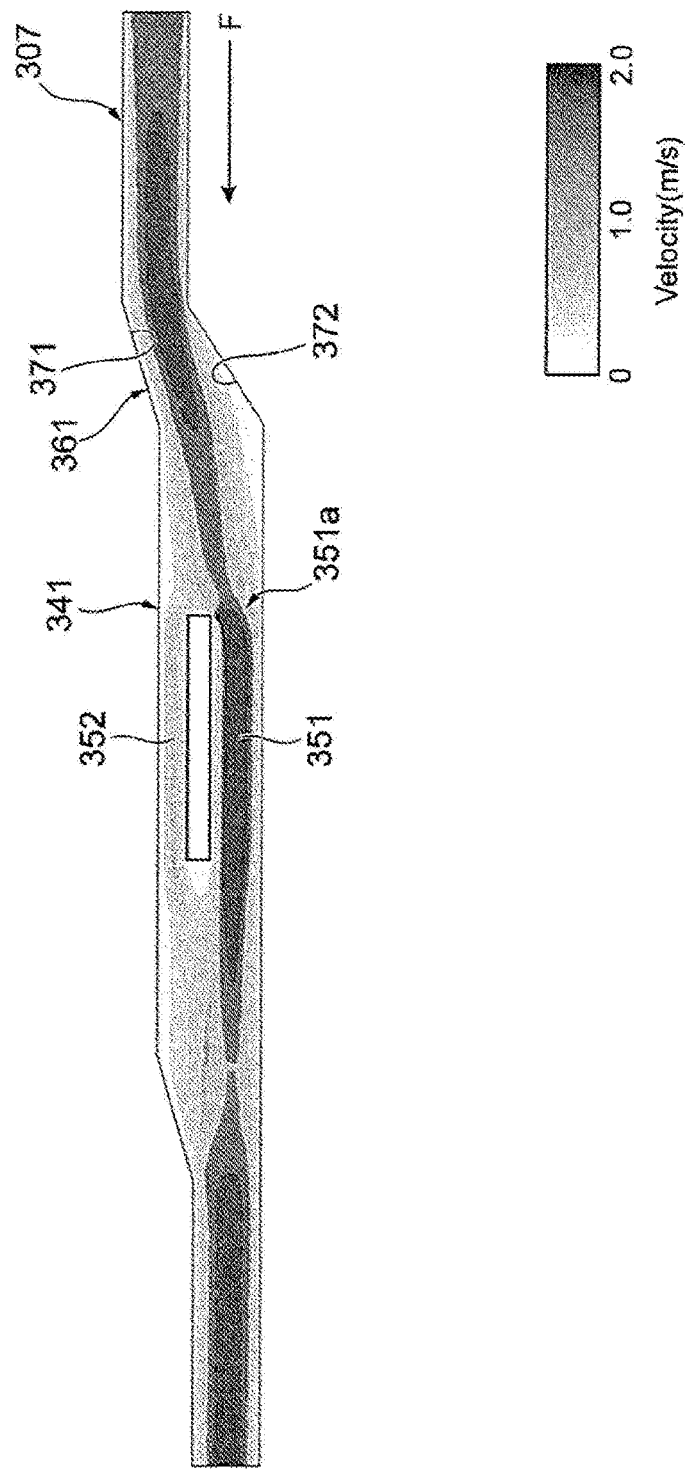
FIG. 8A is a view illustrating a flow velocity of a fluid flowing through the sub-passage of the thermal flowmeter illustrated in FIG. 5.

FIG. 8A is a view illustrating the flow velocity of the fluid flowing through the sub-passage 307 of the thermal flowmeter 300 illustrated in FIG. 5. In FIG. 8A, the flow velocity of the gas 30 to be measured flowing through the sub-passage 307 is illustrated by black and white shading, and the flow velocity of the gas 30 to be measured is higher as the color is darker.

In the thermal flowmeter 300 of the present embodiment, it is possible to deflect the flow of the gas 30 to be measured in the forward flow direction F from the second passage 352 side toward the first passage 351 side by the first inclined surface 371 of the inclined passage 361 provided on the upstream side in the forward flow direction F of the inlet 351a of the first passage 351 of the sub-passage 307. As a result, it is possible to increase the flow velocity of the fluid flowing through the first passage 351 in the forward flow direction F as compared with the related art even at the time of pulsation of the gas 30 to be measured.

Figure 8B:
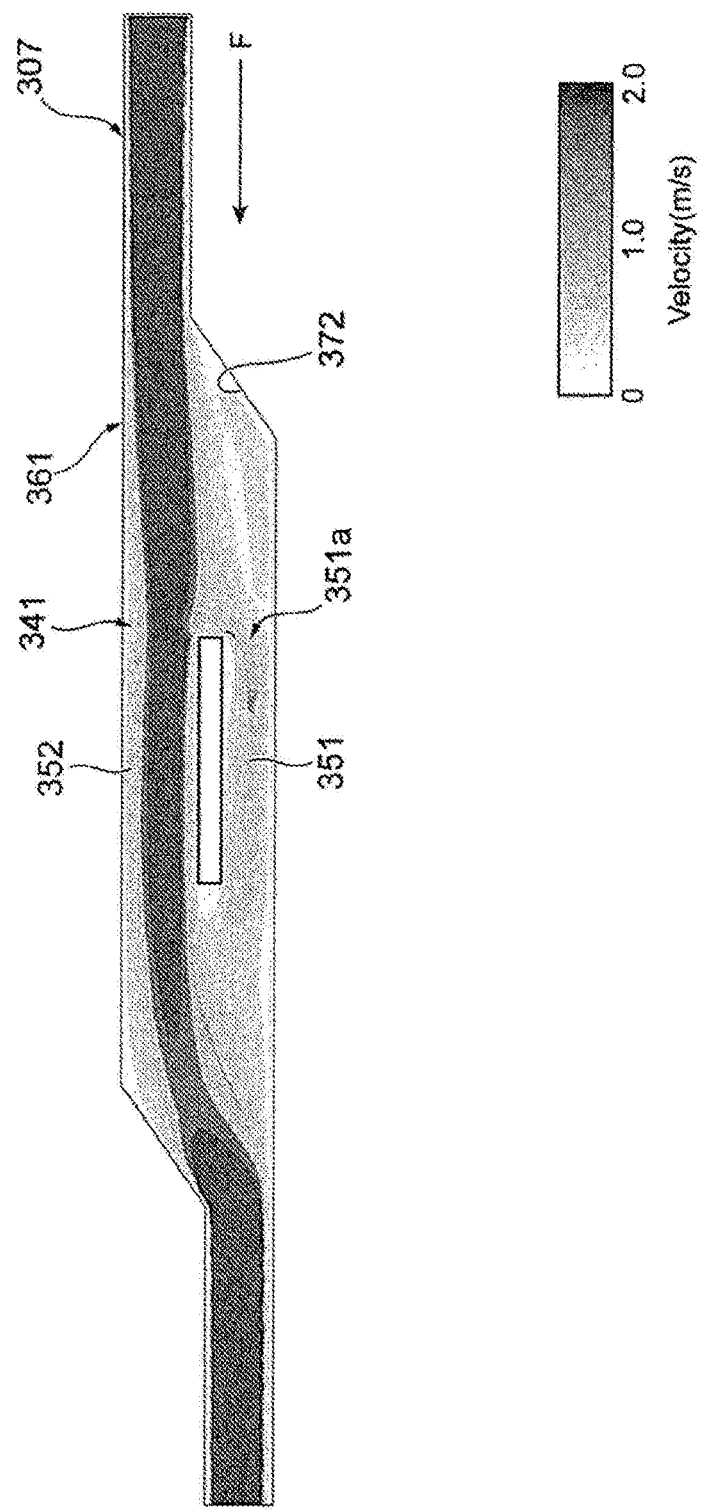
FIG. 8B is a view illustrating a flow velocity of a fluid flowing through a sub-passage having no first inclined surface as illustrated in FIG. 5.

FIG. 8B is a view illustrating a flow velocity of a fluid flowing through the sub-passage 307 of a thermal flowmeter of a comparative example in which the first inclined surface 371 illustrated in FIG. 5 is not provided. Even in FIG. 8B, the flow velocity of the gas 30 to be measured is illustrated by black and white shading, which is similar to FIG. 8A.

In the thermal flowmeter of the comparative example not including the first inclined surface 371, the effect of deflecting the flow of the gas 30 to be measured in the forward flow direction F from the second passage 352 side toward the first passage 351 side is small. Thus, the flow velocity of the gas 30 to be measured flowing through the first passage 351 is lower than the flow velocity of the gas 30 to be measured flowing through the second passage 352, and the flow rate of the fluid flowing through the first passage 351 in the forward flow direction F decreases even at the time of pulsation of the gas 30 to be measured. Such a tendency becomes remarkable when the portion of the sub-passage 307 on the upstream side of the inclined passage 361 is provided to be closer to the second passage 352 than the first passage 351 in the direction perpendicular to the measurement surface 451a of the flow measurement unit 451.

Figure 9:
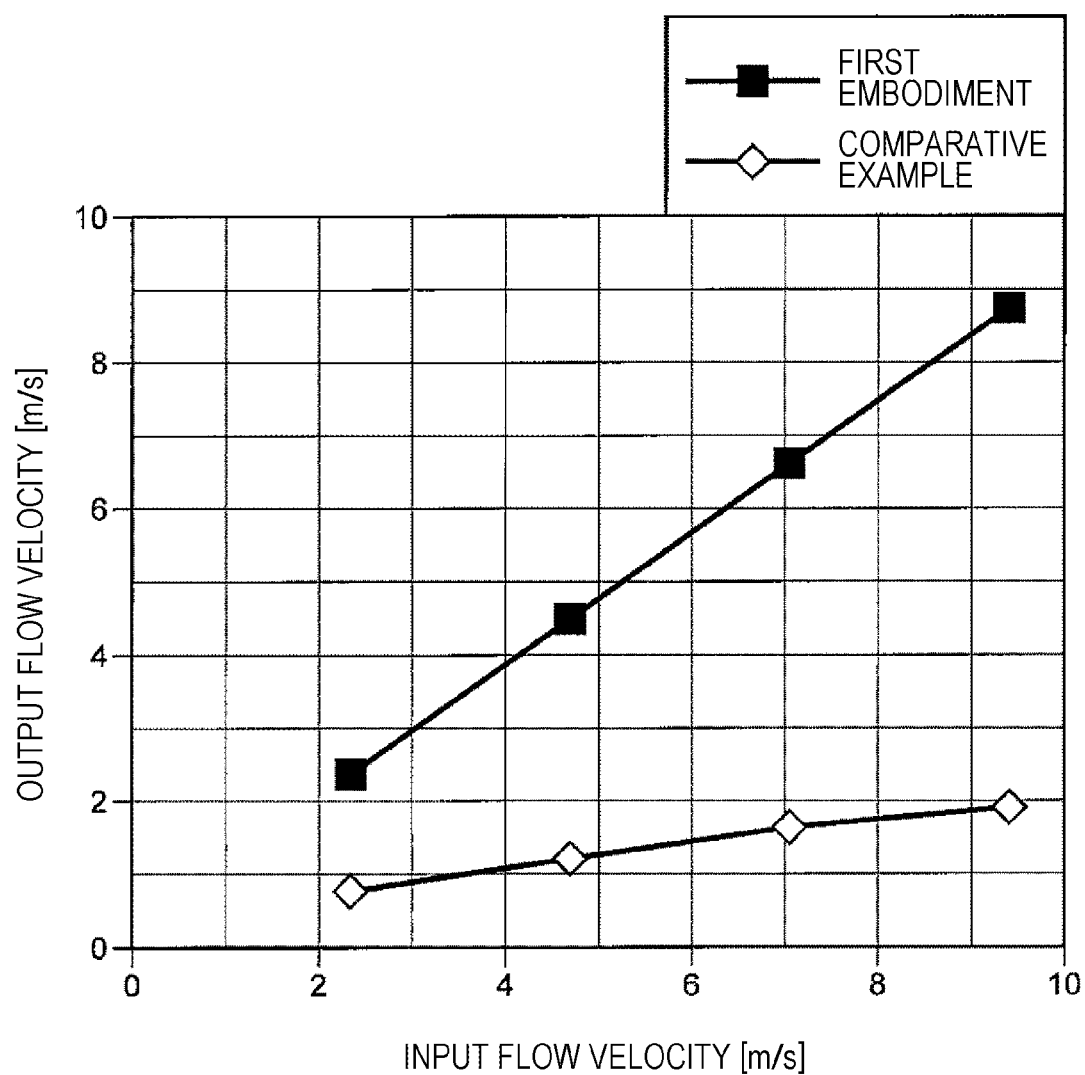
FIG. 9 is a graph illustrating flow measurement results of the thermal flowmeters illustrated in FIGS. 8A and 8B.

FIG. 9 is a graph illustrating a flow velocity measurement result obtained by the thermal flowmeter 300 of the present embodiment illustrated in FIG. 8A and a flow velocity measurement result obtained by the thermal flowmeter of the comparative example illustrated in FIG. 8B. In the graph illustrated in FIG. 9, the horizontal axis represents an input flow velocity, that is, an actual flow velocity of the gas 30 to be measured, and the vertical axis represents output flow velocity, that is, each flow velocity output from the thermal flowmeter 300 of the present embodiment and the thermal flowmeter of the comparative example. When the input flow velocity is changed assuming the pulsation of the gas 30 to be measured, the output flow velocity is significantly decreased from the input flow velocity in the thermal flowmeter of the comparative example, but the decrease of the output flow velocity is suppressed in the thermal flowmeter 300 of the present embodiment.

Figure 10:
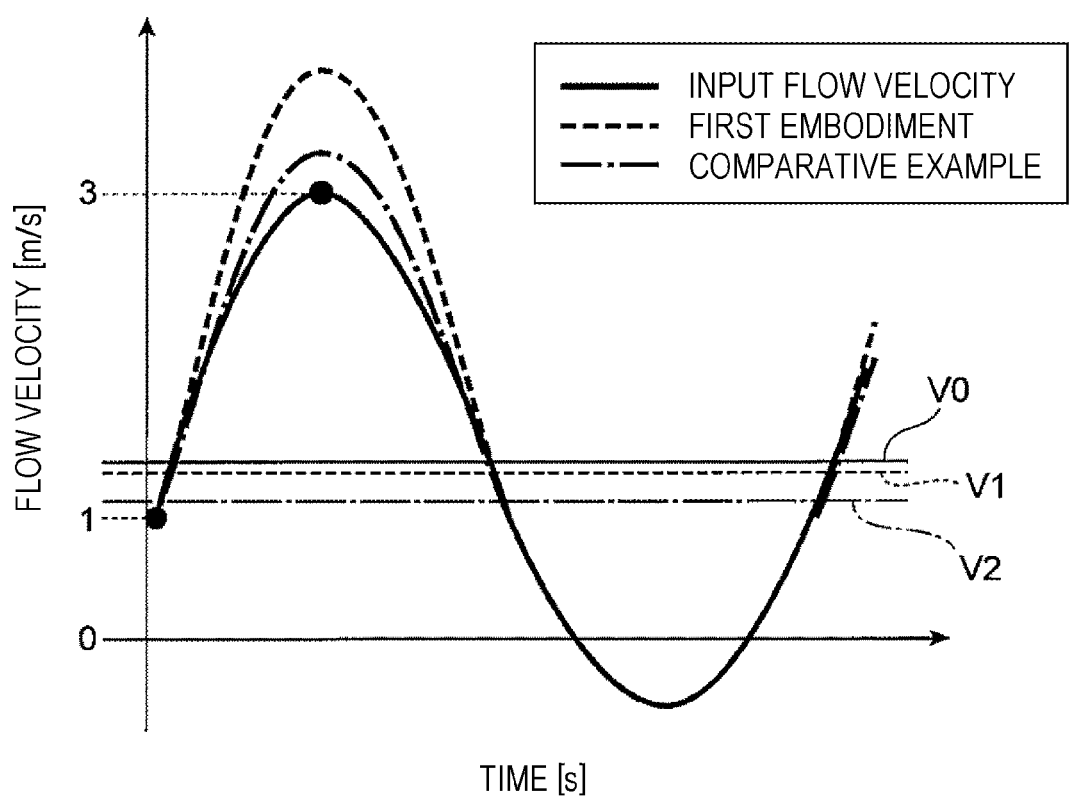
FIG. 10 is a graph illustrating an example of an actual flow velocity of a fluid and a measured flow velocity during pulsation.

FIG. 10 is a graph illustrating an example of an actual flow velocity of a fluid at the time of pulsation and flow velocities of the fluid measured by the thermal flowmeter 300 of the present embodiment and the thermal flowmeter of the comparative example. In the graph illustrated in FIG. 10, the horizontal axis represents time, the vertical axis represents the flow velocity, the solid line represents the actual flow velocity of the gas 30 to be measured, that is, the input flow velocity, the broken line represents the flow velocity measured by the thermal flowmeter 300 of the present embodiment, and the alternate long and short dashed line represents the flow velocity measured by the thermal flowmeter of the comparative example.

In the example illustrated in FIG. 10, the flow velocity of the gas 30 to be measured is measured by the thermal flowmeter 300 of the present embodiment and the thermal flowmeter of the comparative example while changing the input flow velocity from 3 [m/s] to a backflow state of 0 [m/s] or less with 1 [m/s] as a reference. In the thermal flowmeter 300 of the present embodiment, the flow velocity of the first passage 351 in the forward flow direction F of the gas 30 to be measured increases as illustrated in FIG. 8A so that a maximum value of the measured flow velocity increases as indicated by the broken line in FIG. 10, and as a result, an average value V1 of the measured flow velocities becomes approximately equal to an average value V0 of the input flow velocities.

On the other hand, in the thermal flowmeter of the comparative example, the flow velocity of the first passage 351 in the forward flow direction F of the gas 30 to be measured decreases as illustrated in FIG. 8B so that a maximum value of the measured flow velocity does not sufficiently increase as indicated by the alternate long and short dash line in FIG. 10, and as a result, an average value V2 of the measured flow velocities decreases below the average value V0 of the input flow velocities.

Since the average value V1 of the flow velocities, for example, is used as a flow velocity measurement value in the thermal flowmeter 300 of the present embodiment, it is important to suppress the average value V1 of the flow velocities from decreasing below the average value V0 of the actual flow velocities of the gas 30 to be measured. As illustrated in FIG. 10, in the thermal flowmeter 300 of the present embodiment it is possible to shift the average value V1 of the flow velocities to a positive side more than the average value V2 of the flow velocities obtained by the thermal flowmeter of the comparative example to approximate to the average value V0 of the actual flow velocities of the gas 30 to be measured.

Figure 11A:
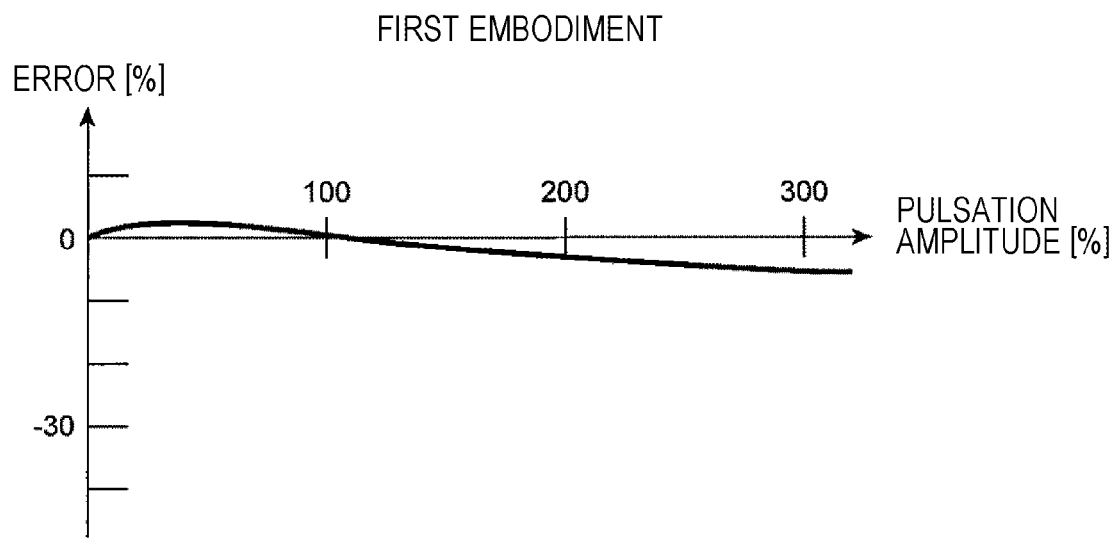
FIG. 11A is a graph illustrating an example of a measurement error of the thermal flowmeter of the first embodiment illustrated in FIG. 8A.
Figure 11B:
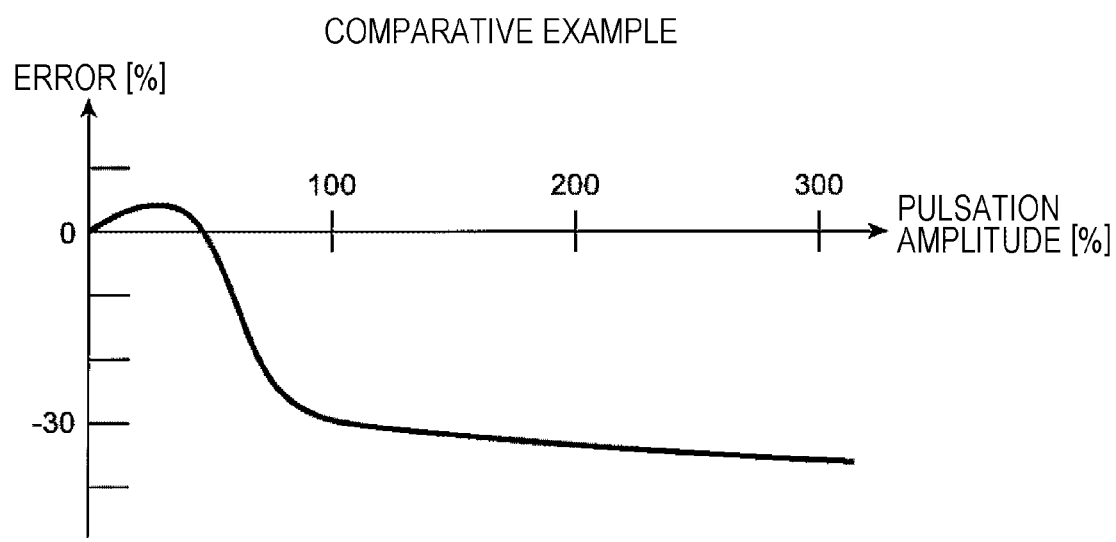
FIG. 11B is a graph illustrating an example of a measurement error of the thermal flowmeter of a comparative example illustrated in FIG. 8B.

FIGS. 11A and 11B are graphs illustrating examples of measurement errors of the thermal flowmeter of the first embodiment illustrated in FIG. 8A and the thermal flowmeter of the comparative example illustrated in FIG. 8B, respectively. As illustrated in FIG. 11A, it is possible to suppress an error in the measured flow velocity in the thermal flowmeter 300 of the present embodiment even if a pulsation amplitude of the flow velocity of the gas 30 to be measured increases since the flow velocity of the first passage 351 in the forward flow direction F of the gas 30 to be measured increases as illustrated in FIG. 8A. On the other hand, an error of the flow velocity to be measured increases in the thermal flowmeter of the comparative example when a pulsation amplitude of the flow velocity of the gas 30 to be measured increases since the flow velocity of the first passage 351 in the forward flow direction F of the gas 30 to be measured decreases as illustrated in FIG. 8B.

In this manner, the thermal flowmeter 300 of the present embodiment is provided with the inclined passage 361 provided on the upstream side of the inlet 351a Of the first passage 351, provided on the measurement surface 451a side of the flow measurement unit 451, in the forward flow direction F of the gas 30 to be measured in the first passage 351, in the measurement flow path 341 of the sub-passage 307. Further, the inclined passage 361 includes the first inclined surface 371, which is inclined from the second passage 352 side toward the first passage 351 side with respect to the forward flow direction F of the gas 30 to be measured, to be closer to the second passage 352 side than the flow measurement unit 451.

With such a configuration, the thermal flowmeter 300 of the present embodiment can deflect the flow of the gas 30 to be measured in the forward flow direction F from the second passage 352 side toward the first passage 351 side by the first inclined surface 371 of the inclined passage 361. As a result, it is possible to increase the flow rate of the gas 30 to be measured flowing through the first passage 351 in the forward flow direction F as compared with in the related art even at the time of pulsation of the gas 30 to be measured. Therefore, according to the thermal flowmeter 300 of the present embodiment, even at the time of pulsation of the gas 30 to be measured, it is possible to suppress the flow velocity measured by the flow measurement unit 451 from being lower than the actual flow velocity, and to reduce the measurement error as compared with the related art.

In addition, in the thermal flowmeter 300 of the present embodiment, the inclined passage 361 has a second inclined surface 372 opposing the first inclined surface 371 in the direction (Z-axis direction) perpendicular to the measurement surface 451a of the flow measurement unit 451 as illustrated in FIG. 5. Further, the second inclined surface 372 is inclined from the second passage 352 side toward the first passage 351 side with respect to the forward flow direction F of the gas 30 to be measured, which is similar to the first inclined surface 371. As a result, it is possible to suppress generation of swirl in the flow of the gas 30 to be measured, which has been deflected by the first inclined surface 371 of the inclined passage 361, and to increase the flow rate of the gas 30 to be measured flowing through the first passage 351 in the forward flow direction F.

In addition, the inclination angle $\theta 2$ of the second inclined surface 372 with respect to the forward flow direction F of the gas 30 to be measured is larger than the inclination angle $\theta 1$ of the first inclined surface 371 with respect to the forward flow direction F of the gas 30 to be measured in the thermal flowmeter 300 of the present embodiment. As a result, it is possible to more effectively suppress generation of swirl in the flow of the gas 30 to be measured, which has been deflected by the first inclined surface 371 of the inclined passage 361, and to increase the flow rate of the gas 30 to be measured flowing through the first passage 351 in the forward flow direction F. In addition, it is possible to achieve both the contamination resistance of the flow measurement unit 451 and the decrease of the measurement flow velocity of the thermal flowmeter 300 with respect to the actual flow velocity of the gas 30 to be measured.

In addition, it is possible to suppress the swirl that is likely to occur in a pipe expanded in diameter by setting the angle difference between the inclination angle $\theta 1$ of the first inclined surface 371 and the inclination angle $\theta 2$ of the second inclined surface 372 to be, for example, between 3° and 15°. That is, an angle at which the inclined passage 361 expands in diameter is set to be gentle to rectify the flow of the gas 30 to be measured in the measurement flow path 341 so that it is possible to stabilize the flow of the gas 30 to be measured in the first passage 351 and the second passage 352.

In addition, in the thermal flowmeter 300 of the present embodiment, the portion of the sub-passage 307 on the upstream side of the inclined passage 361 in the forward flow direction F of the gas 30 to be measured is provided on the second passage 352 side of the first passage 351 in the direction (Z-axis direction) perpendicular to the measurement surface 451a of the flow measurement unit 451.

Thus, when the inclined passage 361 does not have the first inclined surface 371 as illustrated in FIG. 8B, the flow velocity of the gas 30 to be measured flowing through the second passage 352 becomes higher than the flow velocity of the gas 30 to be measured flowing through the first passage 351, and the flow velocity of the gas 30 to be measured flowing through the first passage 351 decreases. However, when the inclined passage 361 has the first inclined surface 371, it is possible to deflect the flow of the gas 30 to be measured in the forward flow direction F from the second passage 352 side toward the first passage 351 side and to increase the flow velocity of the fluid flowing in the forward flow direction F through the first passage 351.

In addition, the extension line L1 of the first inclined surface 371 and the extension line L2 of the measurement surface 451a intersect with each other on the upstream side of the measurement surface 451a in the forward flow direction F of the gas 30 to be measured in the thermal flowmeter 300 of the present embodiment, as illustrated in FIG. 5. As a result, the gas 30 to be measured, which has been deflected toward the first passage 351 side from the second passage 352 side by flowing along the first inclined surface 371, is more likely to be introduced into the first passage 351. In addition, when the extension line L1 of the first inclined surface 371 and the extension line L2 of the measurement surface 451a intersect with each other at the upstream side of the upstream end portion of the flow path exposure portion 430 of the circuit package 400, the deflected gas 30 to be measured is easily introduced through the first passage 351.

As described above, according to the thermal flowmeter 300 of the present embodiment, it is possible to suppress the flow velocity measured by the flow measurement unit 451 from being lower than the actual flow velocity and to reduce the measurement error as compared with the related art even at the time of pulsation of the gas 30 to be measured.

Second Embodiment

Next, a second embodiment of the thermal flowmeter of the present invention will be described using FIG. 12 with reference to FIGS. 1 to 4B and FIGS. 6A to 7B. FIG. 12 is a schematic developed view of the sub-passage 307 of a thermal flowmeter of the present embodiment corresponding to FIG. 5 of the thermal flowmeter 300 of the first embodiment.

Hereinafter, the thermal flowmeter of the present embodiment will be described focusing on differences from the above-described thermal flowmeter 300 of the first embodiment illustrated in FIG. 5. The thermal flowmeter of the present embodiment has the same configuration as the thermal flowmeter of the first embodiment except for the configuration to be described below. Therefore, the same parts as those of the thermal flowmeter 300 of the first embodiment will be denoted by the same reference signs, and the description thereof will be appropriately omitted.

As illustrated in FIG. 12, the thermal flowmeter of the present embodiment is provided with a convex portion 381, which protrudes in the thickness direction (Z-axis direction) of the casing 310, on a wall surface on the second passage 352 side between wall surfaces of the sub-passage 307 opposing in the thickness direction (Z-axis direction) of the casing 310. The convex portion 381 has the first inclined surface 371. A range in which the first inclined surface 371 is provided is the inclined passage 361 in the sub-passage 307 of the thermal flowmeter of the present embodiment.

The first inclined surface 371 illustrated in FIG. 12 is provided on the second passage 352 side of the flow measurement unit 451 and is inclined from the second passage 352 side toward the first passage 351 side with respect to the forward flow direction F, which is similar to the first inclined surface illustrated in FIG. 5. In addition, the extension line L1 of the first inclined surface 371 and the extension line L2 of the measurement surface 451a intersect with each other on the upstream side of the measurement surface 451a in the forward flow direction F and on the upstream side in the forward flow direction F of the flow path exposure portion 430 of the circuit package 400 as the supporting portion of the flow measurement unit 451 in the forward flow direction F in the first inclined surface 371 illustrated in FIG. 12.

In addition, the inclined passage 361 of the sub-passage 307 does not have the second inclined surface 372, and a portion of the sub-passage 307 on the upstream side of the inclined passage 361 in the forward flow direction F is not provided on the second passage 352 side with respect to the first passage 351 in the direction perpendicular to the measurement surface 451a, in the thermal flowmeter of the present embodiment.

However, the thermal flowmeter of the present embodiment has the first passage 351, the second passage 352, and the inclined passage 361 in the sub-passage 307, and the inclined passage 361 has the first inclined surface 371 inclined from the second passage 352 side toward the first passage 351 side with respect to the forward flow direction F to be closer to the second passage 352 side than the flow measurement unit 451, which is similar to the thermal flowmeter 300 of the first embodiment.

Therefore, according to the thermal flowmeter of the present embodiment, it is possible to deflect the flow of the gas 30 to be measured in the forward flow direction F from the second passage 352 side toward the first passage 351 side by the first inclined surface 371 of the inclined passage 361, and to obtain the same effects as those of the thermal flowmeter 300 of the first embodiment.

Third Embodiment

Figure 13:
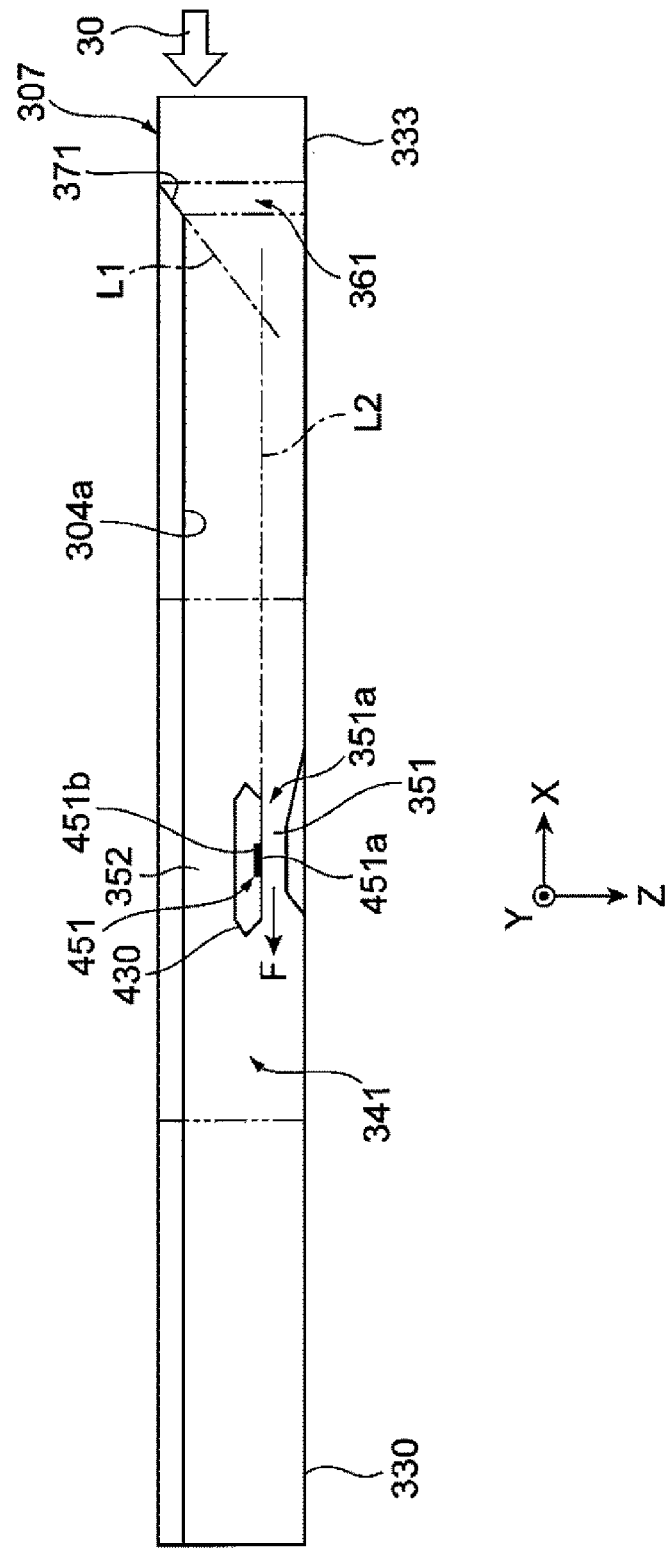
FIG. 13 is a schematic developed view of a sub-passage of a thermal flowmeter according to a third embodiment of the present invention.

Next, a third embodiment of the thermal flowmeter of the present invention will be described using FIG. 13 with reference to FIGS. 1 to 4B and FIGS. 6A to 7B. FIG. 13 is a schematic developed view of the sub-passage 307 of a thermal flowmeter of the present embodiment corresponding to FIG. 5 of the thermal flowmeter 300 of the first embodiment.

Hereinafter, the thermal flowmeter of the present embodiment will be described focusing on differences from the above-described thermal flowmeter 300 of the second embodiment illustrated in FIG. 12. The thermal flowmeter of the present embodiment has the same configuration as the thermal flowmeter of the second embodiment except for the configuration to be described below. Therefore, the same parts as those of the thermal flowmeter of the second embodiment and the thermal flowmeter 300 of the first embodiment will be denoted by the same reference signs, and the description thereof will be appropriately omitted.

As illustrated in FIG. 13, in the thermal flowmeter of the present embodiment, the wall surface 304a on the second passage 352 side between wall surfaces of the sub-passage 307 opposing in the thickness direction (Z-axis direction) of the casing 310 protrudes in the thickness direction (Z-axis direction) of the casing 310. The wall surface 304a is provided, for example, by causing a back surface of the back cover 304 to protrude. The first inclined surface 371 is provided at an end portion of the wall surface 304a on the upstream side in the forward flow direction F of the gas 30 to be measured in the sub-passage 307. A range in which the first inclined surface 371 is provided is the inclined passage 361 in the sub-passage 307 of the thermal flowmeter of the present embodiment.

The thermal flowmeter of the present embodiment has the first passage 351, the second passage 352, and the inclined passage 361 in the sub-passage 307, and the inclined passage 361 has the first inclined surface 371 inclined from the second passage 352 side toward the first passage 351 side with respect to the forward flow direction F to be closer to the second passage 352 side than the flow measurement unit 451, which is similar to the thermal flowmeter 300 of the first embodiment illustrated in FIG. 5 and the thermal flowmeter of the second embodiment illustrated in FIG. 12.

Therefore, according to the thermal flowmeter of the present embodiment, it is possible to deflect the flow of the gas 30 to be measured in the forward flow direction F from the second passage 352 side toward the first passage 351 side by the first inclined surface 371 of the inclined passage 361, and to obtain the same effects as those of the thermal flowmeter 300 of the first embodiment and the thermal flowmeter of the second embodiment.

Fourth Embodiment

Figure 14:
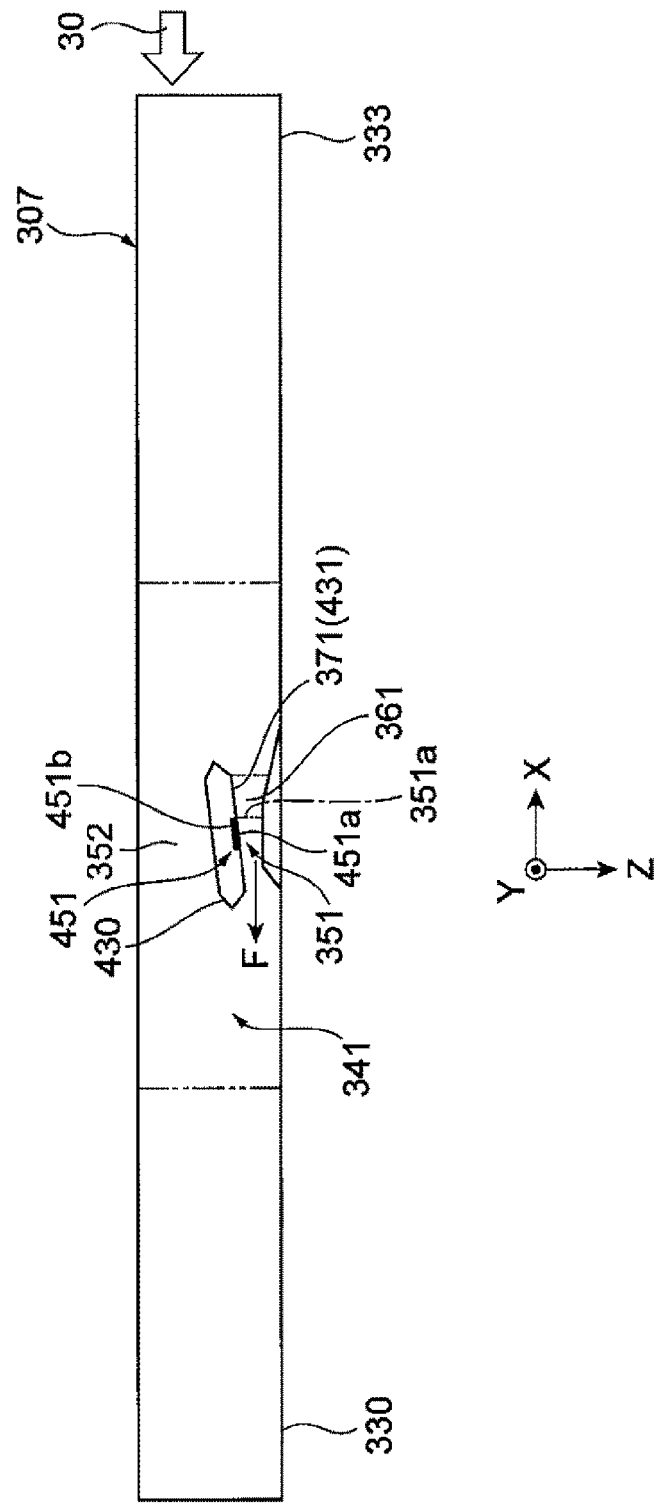
FIG. 14 is a schematic developed view of a sub-passage of a thermal flowmeter according to a fourth embodiment of the present invention.

Next, a fourth embodiment of the thermal flowmeter of the present invention will be described using FIG. 14 with reference to FIGS. 1 to 4B and FIGS. 6A to 7B. FIG. 14 is a schematic developed view of the sub-passage 307 of a thermal flowmeter of the present embodiment corresponding to FIG. 5 of the thermal flowmeter 300 of the first embodiment.

Hereinafter, the thermal flowmeter of the present embodiment will be described focusing on differences from the above-described thermal flowmeter of the second embodiment illustrated in FIG. 12. The thermal flowmeter of the present embodiment has the same configuration as the thermal flowmeter of the second embodiment except for the configuration to be described below. Therefore, the same parts as those of the thermal flowmeter of the second embodiment and the thermal flowmeter 300 of the first embodiment will be denoted by the same reference signs, and the description thereof will be appropriately omitted.

As illustrated in FIG. 14, the flow path exposure portion 430 of the circuit package 400 as the supporting portion of the flow measurement unit 451 is provided to be inclined with respect to the forward flow direction F (X-axis negative direction) of the gas 30 to be measured in the first passage 351, in the thermal flowmeter of the present embodiment. More specifically, the front surface 431 of the flow path exposure portion 430 on the first passage 351 side is inclined from the second passage 352 side to the first passage 351 side with respect to the forward flow direction F.

Incidentally, in the thermal flowmeter of the present embodiment, the first passage 351 is a portion, which overlaps with the measurement surface 451a in the thickness direction (Z-axis direction) of the casing 310, of a passage provided on the measurement surface 451a side of the flow measurement unit 451 by the flow path exposure portion 430 of the circuit package 400 inside the sub-passage 307.

In the thermal flowmeter of the present embodiment, a portion, on an upstream side of an inlet of the first passage 351 in the forward flow direction F, of the front surface 431 of the flow path exposure portion 430 which is inclined with respect to the forward flow direction F forms the first inclined surface 371. Further, the portion, on the upstream side of the inlet 351a of the first passage 351 in the forward flow direction F, of the passage provided on the measurement surface 451a side of the flow measurement unit 451 by the flow path exposure portion 430 forms the inclined passage 361.

That is, the thermal flowmeter of the present embodiment has the first passage 351, the second passage 352, and the inclined passage 361 in the sub-passage 307, and the inclined passage 361 has the first inclined surface 371 inclined from the second passage 352 side toward the first passage 351 side with respect to the forward flow direction F to be closer to the second passage 352 side than the flow measurement unit 451, which is similar to the thermal flowmeters of the second and third embodiments.

Therefore, according to the thermal flowmeter of the present embodiment, it is possible to deflect the flow of the gas 30 to be measured in the forward flow direction F from the second passage 352 side toward the first passage 351 side by the first inclined surface 371 of the inclined passage 361, and to obtain the same effects as those of the thermal flowmeters of the second and third embodiments.

Fifth Embodiment

Figure 15:
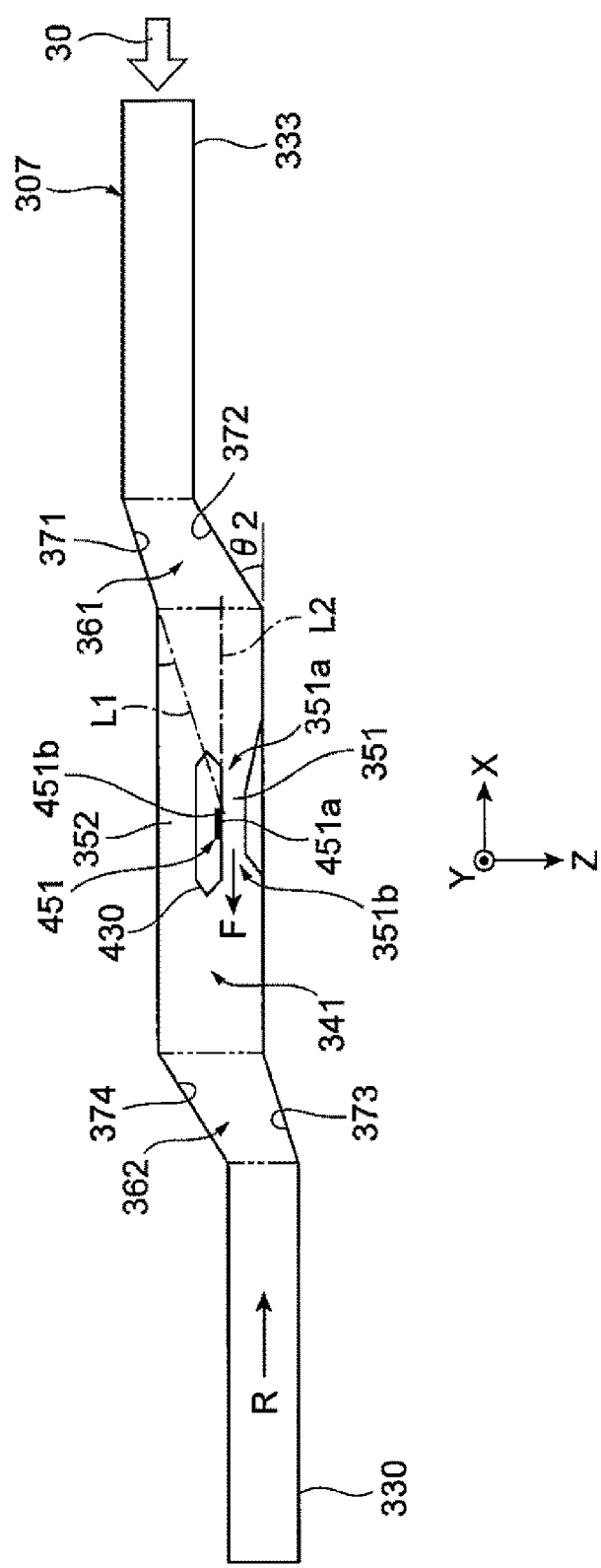
FIG. 15 is a schematic developed view of a sub-passage of a thermal flowmeter according to a fifth embodiment of the present invention.

Next, a fifth embodiment of the thermal flowmeter of the present invention will be described using FIG. 15 with reference to FIGS. 1 to 4B and FIGS. 6A to 7B. FIG. 15 is a schematic developed view of the sub-passage 307 of a thermal flowmeter of the present embodiment corresponding to FIG. 5 of the thermal flowmeter 300 of the first embodiment.

Hereinafter, the thermal flowmeter of the present embodiment will be described focusing on differences from the above-described thermal flowmeter of the first embodiment illustrated in FIG. 5. The thermal flowmeter of the present embodiment has the same configuration as the thermal flowmeter 300 of the first embodiment except for the configuration to be described below. Therefore, the same parts as those of the thermal flowmeter 300 of the first embodiment will be denoted by the same reference signs, and the description thereof will be appropriately omitted.

In the thermal flowmeter of the present embodiment, the sub-passage 307 has a second inclined passage 362 on a downstream side of an outlet 351b of the first passage 351 in the forward flow direction F. The second inclined passage 362 has a third inclined surface 373, which is inclined from the first passage 351 side toward the second passage 352 side with respect to the forward flow direction F, to be closer to the first passage 351 side than the flow measurement unit 451.

In addition, in the thermal flowmeter of the present embodiment, the second inclined passage 362 has a fourth inclined surface 374 opposing the third inclined surface 373 in the direction (Z-axis direction) perpendicular to the measurement surface 451a. The fourth inclined surface 374 is inclined from the second passage 352 side toward the first passage 351 side with respect to the forward flow direction F.

Further, in the thermal flowmeter of the present embodiment, a portion of the sub-passage 307 on a downstream side of the second inclined passage 362 in the forward flow direction F is provided on the first passage 351 side of the second passage 352 in the direction (Z-axis direction) perpendicular to the measurement surface 451a. In other words, the sub-passage 307 has the inclined passage 361 and the second inclined passage 362, which have a point-symmetric configuration with respect to a point on the flow measurement unit 451, on the upstream side and the downstream side of the measurement flow path 341 in the forward flow direction F.

The thermal flowmeter of the present embodiment has the same configuration as the above-described thermal flowmeter 300 of the first embodiment, and thus, can obtain the same effects as those of the above-described thermal flowmeter 300 of the first embodiment. In addition, the thermal flowmeter of the present embodiment has the second inclined passage 362, and thus, it is possible to deflect the gas 30 to be measured flowing in a reverse flow direction R opposite to the forward flow direction F from the first passage 351 side to the second passage 352 side by the third inclined surface 373, from the downstream side in the forward flow direction F of the gas 30 to be measured in the measurement flow path 341.

As a result, it is possible to increase the flow velocity of the gas 30 to be measured flowing through the second passage 352 in the reverse flow direction R (X-axis positive direction) as compared with the related art at the time of pulsation of the gas 30 to be measured, and to decrease the flow velocity of the gas 30 to be measured flowing through the first passage 351 in the reverse flow direction R as compared with the related art. As a result, it is possible to shift a negative peak of a waveform of the flow velocity illustrated by the broken line in FIG. 10 to a positive side and to make the average value V1 of the flow velocity measured by the thermal flowmeter to approximate to the average value V0 of the flow velocity of the actual gas 30 to be measured.

Further, in the thermal flowmeter of the present embodiment, the second inclined passage 362 has the fourth inclined surface 374 which opposes the third inclined surface 373 and is inclined from the second passage 352 side toward the first passage 351 side with respect to the forward flow direction F. As a result, it is possible to suppress generation of swirl in the flow of the gas 30 to be measured in the reverse flow direction R, which has been deflected by the third inclined surface 373 of the second inclined passage 362, and to increase the flow rate of the gas 30 to be measured flowing through the second passage 352 in the reverse flow direction R.

Therefore, according to the thermal flowmeter of the present embodiment, even at the time of pulsation of the gas 30 to be measured, it is possible to more effectively suppress the flow velocity measured by the flow measurement unit 451 from being lower than the actual flow velocity, and to reduce the measurement error as compared with the related art.

Although the embodiment of the present invention has been described in detail with reference to the drawings as above, a specific configuration is not limited to the embodiment, and design alterations or the like made in a scope not departing from a gist of the present invention is included in the present invention.

REFERENCE SIGNS LIST 30 gas (fluid) to be measured
124 main passage
300 thermal flowmeter
307 sub-passage
307A straight passage
307B branch passage
310 casing
312 first outlet (discharge port)
351 first passage
351a inlet
351b outlet of first passage
352 second passage
361 inclined passage
362 second inclined passage
371 first inclined surface
372 second inclined surface
373 third inclined surface
374 fourth inclined surface
451 flow measurement unit
451a measurement surface
451b back surface
F forward flow direction
L1 extension line of first inclined surface
L2 extension line of measurement surface
θ1 inclination angle of first inclined surface
θ2 inclination angle of second inclined surface

The invention claimed is:

1. A thermal flowmeter comprising:
a sub-passage that takes a part of a fluid flowing through a main passage; and
a flow measurement unit that is disposed in the sub-passage,
wherein the sub-passage includes: a first passage provided on a measurement surface side of the flow measurement unit; a second passage provided on a back surface side of the flow measurement unit; and an inclined passage provided on an upstream side of an inlet of the first passage in a forward flow direction of the fluid in the first passage, and
the inclined passage includes a first inclined surface, which is inclined from a side of the second passage toward a side of the first passage with respect to the forward flow direction, to be closer to the side of the second passage than the flow measurement unit.

2. The thermal flowmeter according to claim 1, wherein the inclined passage includes a second inclined surface which opposes the first inclined surface in a direction perpendicular to the measurement surface of the flow measurement unit, and
the second inclined surface is inclined from the side of the second passage toward the side of the first passage with respect to the forward flow direction.

3. The thermal flowmeter according to claim 2, wherein an inclination angle of the second inclined surface with respect to the forward flow direction is larger than an inclination angle of the first inclined surface with respect to the forward flow direction.

4. The thermal flowmeter according to claim 1, wherein a portion of the sub-passage on the upstream side of the inclined passage in the forward flow direction is provided to be closer to the side of the second passage than the first passage in a direction perpendicular to the measurement surface of the flow measurement unit.

5. The thermal flowmeter according to claim 1, wherein in a section of the sub-passage parallel to the forward flow direction and perpendicular to the measurement surface of the flow measurement unit, an extension line of the first inclined surface and an extension line of the measurement surface intersect with each other on the upstream side of a flow measurement surface in the forward flow direction.

6. The thermal flowmeter according to claim 1, wherein the sub-passage includes: a straight passage that takes a part of the fluid flowing through the main passage; a discharge port that discharges a part of the fluid flowing through the straight passage; and a branch passage that branches from the straight passage on the upstream side of the discharge port in the forward flow direction of the fluid flowing through the straight passage, and
the first passage, the second passage, and the inclined passage are provided in the branch passage.

7. The thermal flowmeter according to claim 1, further comprising
a flat casing that is disposed inside the main passage and defines the sub-passage,
wherein the measurement surface of the flow measurement unit is perpendicular to a thickness direction of the casing.

8. The thermal flowmeter according to claim 1, wherein
the sub-passage includes a second inclined passage on a downstream side of an outlet of the first passage in the forward flow direction, and the second inclined passage includes a third inclined surface, which is inclined from the side of the first passage toward the side of the second passage side with respect to the forward flow direction, to be closer to the side of the first passage than the flow measurement unit.

9. The thermal flowmeter according to claim 8, wherein
the second inclined passage includes a fourth inclined surface which opposes the third inclined surface in a direction perpendicular to the measurement surface of the flow measurement unit, and the fourth inclined surface is inclined from the side of the second passage toward the side of the first passage with respect to the forward flow direction.

* * * * *